US010033885B2

(12) United States Patent
Suzuki

(10) Patent No.: US 10,033,885 B2
(45) Date of Patent: Jul. 24, 2018

(54) INFORMATION PROCESSING APPARATUS, INFORMATION PROCESSING SYSTEM, AND CONTROL METHOD FOR GENERATING A PREVIEW IMAGE OF PRINT DATA

(71) Applicant: Shohta Suzuki, Kanagawa (JP)

(72) Inventor: Shohta Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/201,711

(22) Filed: Jul. 5, 2016

(65) Prior Publication Data

US 2017/0013139 A1    Jan. 12, 2017

(30) Foreign Application Priority Data

Jul. 6, 2015  (JP) ................................. 2015-135707
Jun. 23, 2016 (JP) ................................. 2016-124805

(51) Int. Cl.
*H04N 1/00*     (2006.01)
*G06F 3/12*     (2006.01)

(52) U.S. Cl.
CPC ......... *H04N 1/0023* (2013.01); *G06F 3/1208* (2013.01); *G06F 3/1222* (2013.01); *G06F 3/1238* (2013.01); *G06F 3/1256* (2013.01); *G06F 3/1267* (2013.01); *G06F 3/1288* (2013.01); *H04N 1/0044* (2013.01); *H04N 1/00244* (2013.01)

(58) Field of Classification Search
CPC ............ H04N 1/0023; H04N 1/00244; H04N 1/0044; G06F 3/1208; G06F 3/1256; G06F 3/1271
See application file for complete search history.

(56) References Cited

U.S. PATENT DOCUMENTS

| | | | | |
|---|---|---|---|---|
| 8,826,126 | B1* | 9/2014 | Toscano ................ | G06F 17/212 358/1.15 |
| 2006/0066899 | A1* | 3/2006 | Yoshida ................ | G06F 3/1256 358/1.15 |
| 2008/0186537 | A1* | 8/2008 | Isobe .................... | G06F 17/212 358/1.15 |
| 2017/0257493 | A1* | 9/2017 | Kawano ................. | G06F 21/44 |

FOREIGN PATENT DOCUMENTS

| | | |
|---|---|---|
| JP | 2012-245695 | 12/2012 |
| JP | 2013-140554 | 7/2013 |

\* cited by examiner

*Primary Examiner* — Iriana Cruz
(74) *Attorney, Agent, or Firm* — IPUSA, PLLC

(57) ABSTRACT

An information processing apparatus includes a receiver configured to receive a print job from a client device; a preview image generator configured to generate a preview image of a print data item included in the print job; and a transmitter configured to transmit the generated preview image to an image forming apparatus. The preview image generator limits the generation of the preview image of the print data item based on a page condition when a first print language is used in the print data item, and the preview image generator limits the generation of the preview image of the print data item based on a time condition when a second print language is used in the print data item.

21 Claims, 16 Drawing Sheets

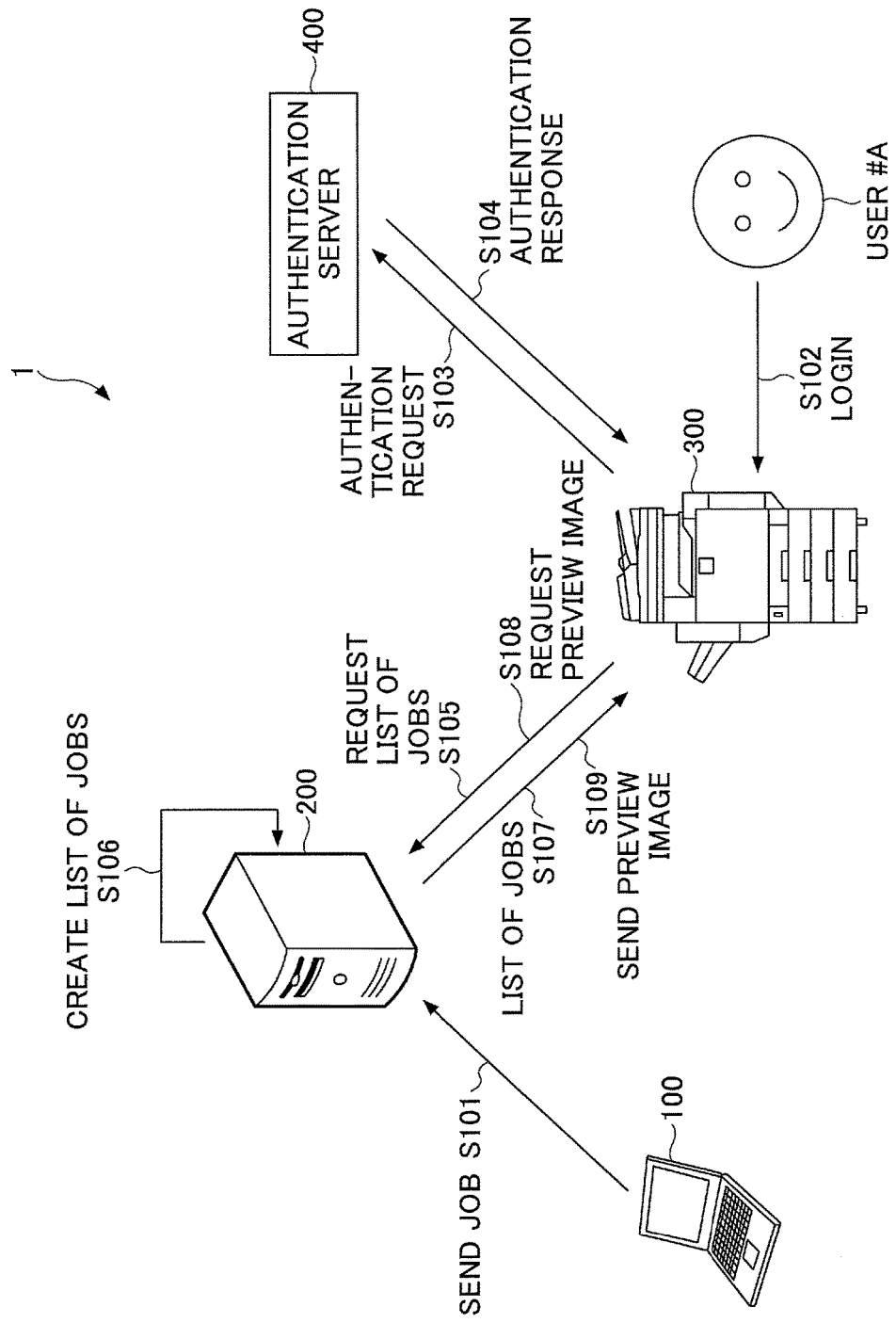

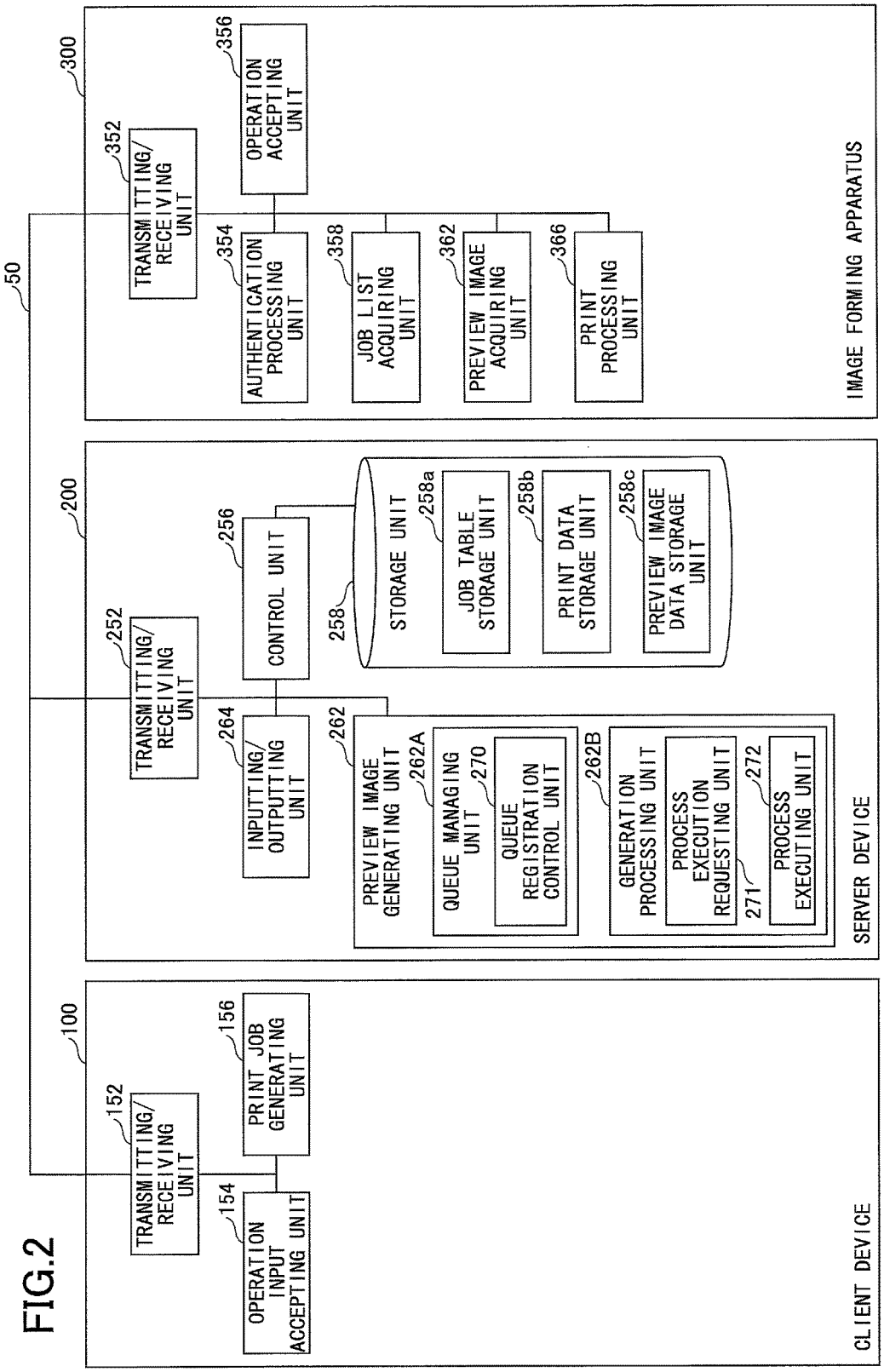

FIG.3

| JOB ID | NAME OF JOB | USER ID | JOB INPUT TIME AND DATE | NUMBER OF COPIES | NUMBER OF PAGES | DOUBLE-SIDED INFORMATION | COLOR INFORMATION | PRINT LANGUAGE | PRINT DATA STORAGE DESTINATION | PREVIEW IMAGE DATA STORAGE DESTINATION | WHETHER TO GENERATE PREVIEW IMAGE | PREVIEW IMAGE GENERATION STATE | ... |
|---|---|---|---|---|---|---|---|---|---|---|---|---|---|
| 0001 | doc001 | user1 | 2011/04/26 14:13:54 | 1 | 18 | SINGLE-SIDED | COLOR | PS | <path>/0001 | <path>/0001 | ON | BEFORE GENERATION | ... |
| 0002 | doc002 | user1 | 2011/04/26 14:52:11 | 5 | 2 | DOUBLE-SIDED | BLACK-AND-WHITE | PDF | <path>/0002 | <path>/0002 | OFF | – | ... |
| 0003 | test1 | user2 | 2011/04/26 16:23:06 | 2 | 9 | DOUBLE-SIDED | COLOR | RPCS | <path>/0003 | <path>/0003 | ON | GENERATION COMPLETED | ... |
| 0004 | text1 | user3 | 2011/04/26 17:30:31 | 16 | 2 | SINGLE-SIDED | TWO-COLOR | PCC | <path>/0004 | <path>/0004 | ON | GENERATION IN PROGRESS | ... |
| 0005 | doc003 | user1 | 2011/04/27 09:29:58 | 23 | 1 | SINGLE-SIDED | MONOCHROME | PS | <path>/0005 | <path>/0005 | OFF | – | ... |
| 0006 | test2 | user2 | 2011/04/27 11:22:25 | 8 | 3 | SINGLE-SIDED | BLACK-AND-WHITE | PDF | <path>/0006 | <path>/0006 | ON | GENERATION COMPLETED | ... |
| ... | ... | ... | ... | ... | ... | ... | ... | ... | ... | ... | ... | ... | ... |

FIG.4

| SETTING ITEM | SETTING VALUE | REMARKS |
|---|---|---|
| (1) GENERATE PREVIEW IMAGE | ☐ GENERATE<br>☐ DO NOT GENERATE | SETTING OF WHETHER TO GENERATE PREVIEW IMAGE |
| (2) PREPARE PREVIEW IMAGE | ☐ PREPARE<br>☐ DO NOT PREPARE | SETTING OF WHETHER TO GENERATE PREVIEW IMAGE WHEN PRINT JOB IS RECEIVED |
| (3) MAXIMUM PROCESS NUMBER OF PREVIEW IMAGE GENERATION | 1-3 | NUMBER OF EXECUTABLE PROCESSES OF GENERATING PREVIEW IMAGES |
| (4) PREVIEW IMAGE OF SECOND PRINT LANGUAGE | ☐ ALL<br>☐ SOME | SELECT EITHER ONE WHEN USING SECOND PRINT LANGUAGE |
| (5) AMOUNT OF PREVIEW IMAGES OF SECOND PRINT LANGUAGE TO BE GENERATED | ☐ MANY<br>☐ USUAL<br>☐ LESS | SET WHEN SOME IS SELECTED IN (4) |

FIG.6A

ON-DEMAND PRINTING

PLEASE SELECT A DOCUMENT, AND PRESS THE [PRINT] KEY OR THE [DELETE] KEY

| | | | | | | UPDATE DISPLAY |
|---|---|---|---|---|---|---|
| | | | | | | DESCENDING ORDER OF NEWNESS / DESCENDING ORDER OF OLDNESS | doc001.doc    2011/04/26   14:13:54   2 PAGES   7 COPIES   PRINTING COMPLETED   DOUBLE-SIDED   BLACK-AND-WHITE   2in1 doc002.doc    2011/04/26   14:13:35   2 PAGES   1 COPY     SINGLE-SIDED   COLOR   4in1 doc003.doc    2011/04/26   14:13:13   1 PAGE   1 COPY     DOUBLE-SIDED   BLACK-AND-WHITE doc004.doc    2011/04/26   14:12:55   1 PAGE   1 COPY   PRINTING COMPLETED   SINGLE-SIDED   COLOR   9in1 doc005.doc    2011/04/26   14:12:30   1 PAGE   12 COPIES   DOUBLE-SIDED   BLACK-AND-WHITE   16in1

USER NAME: user1

NUMBER OF DOCUMENTS: 15

2/3   BACK   NEXT

DELETE   PREVIEW   PRINT

CLOSE

FIG.12

| JOB ID | PRINT LANGUAGE | STORAGE DESTINATION OF PRINT DATA | GENERATION TARGET PAGE NUMBER |
|---|---|---|---|
| 0001 | PCL | <path>/0001 | – |
| 0002 | PCL | <path>/0002 | 3 |
| 0003 | PS | <path>/0003 | – |

INFORMATION PROCESSING APPARATUS, INFORMATION PROCESSING SYSTEM, AND CONTROL METHOD FOR GENERATING A PREVIEW IMAGE OF PRINT DATA

CROSS-REFERENCE TO RELATED APPLICATION

The present application claims priority under 35 U.S.C. § 119 to Japanese Patent Application No. 2015-135707, filed on Jul. 6, 2015, and 2016-124805, filed on Jun. 23, 2016. The contents of which are incorporated herein by reference in their entirety.

BACKGROUND OF THE INVENTION

1. Field of the Invention

The present disclosure relates to information processing apparatuses, information processing systems, and control methods.

2. Description of the Related Art

There is known a "pull printing method" of storing print data of a user in a server device and printing the print data according to a request of the user.

In the pull printing method, after a print job including print data is input from a client device into a server device, the user of the client device specifies a print job for executing printing from a list of print jobs displayed on an image forming apparatus. The image forming apparatus acquires the specified print job from the server device, and executes printing.

Furthermore, in the pull printing method, there is known a function of displaying a preview image on the operation panel of an image forming apparatus before actually executing the printing, in order to avoid wasteful printing and to contribute to the reduction in Total Cost of Ownership (TCO) (see, for example, Patent Document 1).

In this case, the server device generates a preview image when the print job is input or when a request is received from the image forming apparatus.

In a case where a preview image is generated when a print job is input, the generated preview images may not be viewed by the user. As a result, the load of the server device may increase. However, in this case, the server device is able to quickly return a preview image in response to a request for a preview image from the image forming apparatus. On the other hand, in a case where a preview image is generated when a request for a preview image is received from the image forming apparatus, it takes time to return the preview image to the image forming apparatus. However, in this case, the load of the server device can be prevented from increasing.

Furthermore, the server device generates preview images by applying different methods of generating preview images, depending on the print language used for the print job.

Patent Document 1: Japanese Unexamined Patent Application Publication No. 2012-245695

SUMMARY OF THE INVENTION

The present disclosure provides an information processing apparatus, an information processing system, and a control method, in which one or more of the above-described disadvantages are eliminated.

According to one aspect of the present disclosure, there is provided an information processing apparatus including a receiver configured to receive a print job from a client device; a preview image generator configured to generate a preview image of a print data item included in the print job; and a transmitter configured to transmit the generated preview image to an image forming apparatus, wherein the preview image generator limits the generation of the preview image of the print data item based on a page condition when a first print language is used in the print data item, and the preview image generator limits the generation of the preview image of the print data item based on a time condition when a second print language is used in the print data item.

BRIEF DESCRIPTION OF THE DRAWINGS

Other objects, features and advantages of the present disclosure will become more apparent from the following detailed description when read in conjunction with the accompanying drawings, in which:

FIG. 1 is a diagram illustrating an example of an overall system configuration of a print system according to a first embodiment of the present disclosure;

FIG. 2 is a diagram illustrating functional configuration according to the first embodiment of the present disclosure;

FIG. 3 is a diagram illustrating an example of a job table according to the first embodiment of the present disclosure;

FIG. 4 is a diagram illustrating an example of setting items of a server according to the first embodiment of the present disclosure;

FIGS. 6A and 6B are diagrams illustrating examples of displays of an operation panel of an image forming apparatus according to the first embodiment of the present disclosure;

FIG. 12 is a diagram illustrating an example of a queue table according to the first embodiment of the present disclosure;

DETAILED DESCRIPTION OF THE PREFERRED EMBODIMENTS

Figure 5A:
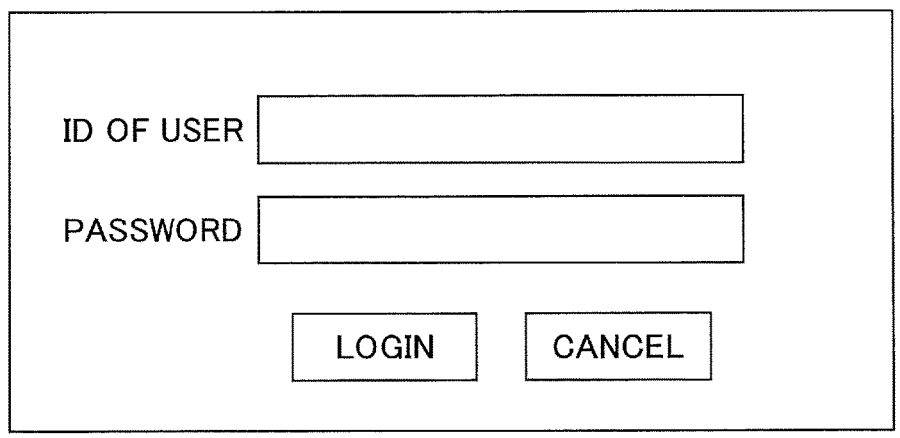
FIGS. 5A and 5B are diagrams illustrating examples of displays of an operation panel of an image forming apparatus according to the first embodiment of the present disclosure.

A problem to be solved by an embodiment of the present disclosure is to flexibly generate preview images according to various circumstances.

First Embodiment

Overall System Configuration and Functional Configurations of Devices (1) Overall System Configuration FIG. 1 is a diagram illustrating an example of an overall system configuration of a print system 1 according to a first embodiment of the present disclosure. The print system 1 includes a client device 100, a server device 200, an image forming apparatus 300, and an authentication server 400. These devices are connected to each other via a communication network 50. The communication network 50 is not limited to a particular communication method, and the devices are connected to each other by using the Ethernet (registered trademark) and Transmission Control Protocol/Internet Protocol (TCP/IP), etc. Furthermore, the devices may be connected to each other via a Local Area Network (LAN), a Virtual Private Network (VPN), and an exclusive-use line.

Referring to FIG. 1, a description is given of an example of operation procedures of the print system 1.

In step S101, a user #A operates the client device 100 to give an instruction to input a print job (hereinafter referred to as a "job") to the server device 200, and then the job that is instructed to be input and an identifier of the user #A are sent to the server device 200. The server device 200 stores the received job in association with the identifier of the user #A. In this case, the identifier of the user #A and the job are stored in association with each other.

In step S102, the user #A inputs information required for logging into the image forming apparatus 300. For example, in this step, the user #A inputs a user ID and a password in the image forming apparatus 300.

In step S103, an authentication request is sent from the image forming apparatus 300 to the authentication server 400. The authentication request includes the user ID and the password.

In step S104, the image forming apparatus 300 receives a response to the authentication request from the authentication server 400. When the user ID and the password are successfully authenticated, the user #A is able to use various functions (print, scan, and fax, etc.) of the image forming apparatus 300 associated with the user #A.

In step S105, the image forming apparatus 300 requests the server device 200 to send a list of jobs that can be executed by the user #A.

In step S106, the server device 200 generates a list of jobs that are associated with the user #A. Here, the jobs that are associated with the user #A are jobs that the have been input from the client device 100 of the user #A.

The server device 200 generates a preview image of the job included in the list. Furthermore, the server device 200 may generate a preview image when a job is input, or when a preview image is requested from the image forming apparatus 300. Details are described below.

Note that generating a preview image means generating data, which is converted into an image such as a Joint Photographic Experts Group (JPEG) image, etc., to be displayed. A preview image is generated in units of one page of print data included in the job.

In step S107, the server device 200 sends a list of jobs to the image forming apparatus 300.

In step S108, the image forming apparatus 300 receives the request from the user #A and then sends a request for a preview image. The request for a preview image includes an identifier (job ID) identifying the job specified by the user #A and a page number of the requested preview image.

In step S109, the server device 200 sends the preview image to the image forming apparatus 300. The preview image that is sent is displayed on an operation accepting unit 356 of the image forming apparatus 300. The user #A is able to confirm the preview image displayed on the operation accepting unit 356 and determine whether to execute printing.

When a specification of a job and an instruction to execute printing of the specified job are received from the user #A, the image forming apparatus 300 sends a request for print data of the specified job, to the server device 200. The request for print data includes a job ID of the job specified by the user #A. When the server device 200 receives the request for print data, the server device 200 identifies the job based on the job ID, and returns the print data of the job to the image forming apparatus 300. The image forming apparatus 300 executes printing of the received print data.

Here, the client device 100 is an example of a client and the server device 200 is an example of an information processing apparatus. Furthermore, a combination of the server device 200 and the image forming apparatus 300 is an example of an information processing system.

(2) Functional Configuration of Server Device

Referring to FIG. 2, a description is given of a functional configuration of the server device 200 according to the first embodiment.

The server device 200 includes a transmitting/receiving unit 252, an inputting/outputting unit 264, a control unit 256, a preview image generating unit 262, and a storage unit 258.

The transmitting/receiving unit 252 receives a job from the client device 100. The preview image generating unit 262 generates a preview image of print data included in the job. The transmitting/receiving unit 252 sends the generated preview image to the image forming apparatus 300.

When a first print language is used in the print data, the preview image generating unit 262 implements control such as limiting the generation of a preview image of print data, based on a condition relating to pages.

When a second print language is used in the print data, the preview image generating unit 262 implements control such as limiting the generation of a preview image of print data, based on a condition relating to time.

Specifically, when the preview image generating unit 262 implements control in the generation of a preview image based on a condition relating to pages, the preview image generating unit 262 executes a process of generating a preview image corresponding to a page specified by a condition of the print data. Furthermore, when the preview image generating unit 262 implements control in the generation of a preview image based on a condition relating to time, the preview image generating unit 262 executes a process of generating a preview image corresponding print data for a predetermined time starting from the first page of the print data.

Here, a first print language or a second print language being used in the print data, may be expressed as a first print language or a second print language being used in a job.

For example, the preview image generating unit 262 sets a predetermined period in a timer used when generating preview images, and while the timer is activated, the preview image generating unit 262 generates preview images. Furthermore, the timer may be activated at a timing when the preview image generating unit 262 starts generating preview images. Note that a variable period is set as the predetermined period.

Here, a predetermined time is an example of a period that is set according to a condition relating to time.

The first print language is, for example, Refined Print Command Stream (RPCS) or Printer Control Language (PCL), etc. When these print languages are used, it is possible to generate preview images by specifying the page range (first page and last page) of the print data for which preview images are to be generated. When the first print language is used, for example, a setting is made in the server device 200 to generate preview images of "the fifth page to the tenth page" or to generate a preview image of "the fifth page" of the print data, etc.

The second print language is, for example, Post Script (PS) or Portable Document Format (PDF), etc. When the second print language is used, it is not possible to generate preview images by setting a required range for which preview images are to be generated in the server device 200, as in the first print language. Therefore, when the second print language is used, a timer according to the setting of generating preview images is used when generating preview images.

The administrator of the server device 200 is able to adjust the time length of the timer used when generating preview images in a plurality of stages, in consideration of the load of the server device 200. For example, the administrator inputs "long", "regular", or "short", etc., in the timer used when generating preview images. The server device 200 sets a period corresponding to the input by the administrator, in the timer used when generating preview images.

In a first generating method, the preview image generating unit 262 generates a preview image in response to receiving a job. In this case, at the timing when a job is received by the server device 200 from the client device 100, the preview image generating unit 262 starts generating a preview image.

In the first generating method, when a preview image is already generated when a request to send a preview image is received from the image forming apparatus 300, the server device 200 is able to send a preview image in response to the request. In this case, the preview image is quickly displayed on the image forming apparatus 300, and therefore it is highly convenient for the user. However, the server device 200 generates and stores preview images that may not be requested to be previewed by the user, and therefore the load of the server device 200 increases.

Furthermore, in a second generating method, the preview image generating unit 262 generates a preview image in response to a request from the image forming apparatus 300. In this case, a preview image that is requested by the user is generated, and therefore the server device 200 is able to efficiently generate preview images that are required to be previewed. However, the user has to wait until a preview image is generated, and therefore the convenience of the user is decreased.

The request for a preview image from the image forming apparatus 300 includes information specifying the page of the preview image. When a preview image of the specified page is not generated, the preview image generating unit 262 generates a preview image that has not been generated.

At least one of the first generating method and the second generating method is implemented. For example, the following method is possible. When the server device 200 receives a job, the server device 200 generates preview images corresponding to the first page to the tenth page. When the server device 200 receives a request to send the preview image from the image forming apparatus 300, the server device 200 sends the preview images corresponding to the first page to the tenth page. When the server device 200 receives a request to send preview images corresponding to the eleventh page and onward from the image forming apparatus 300, the server device 200 generates preview images corresponding to the eleventh page and onward, and sends the generated preview images to the image forming apparatus 300. By combining the first generating method and the second generating method, operations of generating preview images can be flexibly performed.

The storage unit 258 includes a job table storage unit 258a, a print data storage unit 258b, and a preview image data storage unit 258c.

The job table storage unit 258a stores attribute information relevant to the job received from the client device 100. FIG. 3 is a diagram illustrating an example of a job table including items of the attribute information stored in the job table storage unit 258a.

In the job table, a job ID that is the identifier of a job, is stored together with attributes of the job. Specifically, "name of job", "user ID" expressing the user who has sent the job, "job input time and date" that is the time and date when the server device 200 has received the job, attributes relevant to printing ("number of copies", "number of pages", "double-sided information", and "color information"), "print language", "print data storage destination" expressing the storage destination of the print data included in the job, "preview image data storage destination" expressing the storage destination of the preview image, "whether to generate preview image" expressing whether to generate a preview image, and "preview image generation state", etc., are stored in association with the job ID.

When "whether to generate preview image" is "OFF", the preview image generating unit 262 does not generate a preview image.

In "preview image generation state", "before generation" expressing that a preview image is not generated, "generation in progress" expressing that a process of generating a preview image is being executed, "generation completed" expressing that the generation of a preview image has been completed, and "error", etc., are set. Note that the job table storage unit 258a may store the number of pages of preview images that have been generated, in addition to the "preview image generation state".

The print data storage unit 258b stores print data included in the job. The control unit 256 and the preview image generating unit 262, etc., refer to the job table storage unit 258a to identify the storage destination of the print data.

The preview image data storage unit 258c stores preview image data generated by the preview image generating unit 262. The control unit 256 and the preview image generating unit 262, etc., refer to the job table storage unit 258a to identify the storage destination of the preview image.

Note that a preview image is stored in a temporary storage folder when "generation of the preview image is in progress". At a timing when preview images corresponding to the specified number of pages are generated, the preview images are moved to a folder in the preview image data storage unit 258c. Setting information such as a route path of the temporary storage folder and the folder in the storage unit 258 is stored in the storage unit 258. Image data of the generated preview image is stored in a folder having a name of a job ID of the job that is the target for generating a preview image, under the route path.

The inputting/outputting unit 264 of the server device 200 accepts a setting of a process relevant to generating a preview image, from the administrator. The inputting/outputting unit 264 reports the process content to the control unit 256 and the control unit 256 instructs the storage unit 258 to store the set information. The control unit 256 and the preview image generating unit 262 refer to the setting content stored in the storage unit 258, and performs a process of generating a preview image.

For example, as setting items of a process relevant to generating a preview image, items indicated in FIG. 4 may be included.

"(1) Generate preview image" is an item for setting whether to generate a preview image. When the setting value is "generate", the preview image generating unit 262 generates a preview image. On the other hand, when the setting value is "do not generate", the preview image generating unit 262 does not generate a preview image.

"(2) Prepare preview image" is an item for setting whether to generate a preview image at the timing when a print job is received. When the setting value is "prepare", the preview image generating unit 262 generates a preview image at the timing when a job is received from the client device 100. That is, the preview image generating unit 262 executes the first generating method. When the setting value is "do not prepare", the preview image generating unit 262 does not execute the first generating method.

"(3) Maximum process number of preview image generation" is an item for setting the maximum number of executable processes of generating preview images that can be activated at the same time by the preview image generating unit 262. The generation of a preview image inflicts a high load on the server device 200, and therefore this item is provided to limit the number of processes that can be executed at the same time. Furthermore, an item for setting the number of threads and tasks for generating preview images that can be executed at the same time by the preview image generating unit 262, may be set.

Therefore, the preview image generating unit 262 assigns the print data items for generating preview images to processes within a range up to the upper limit of "maximum process number of preview image generation", and executes the processes for generating preview images.

"(4) Preview image of second print language" is an item for setting whether to generate "all" of the preview images or "some" of the preview images.

"(5) Amount of preview images of second print language to be generated" is an item for setting the approximate period during which preview images are to be generated, when "some" is selected in "(4) Preview image of second print language". Note that the period may be set by a user. However, considering that a regular user may be unaware of the average number of preview images that can be created within the set period, in this example, the user is to set any one of "many", "usual", and "less". Therefore, information including items associated with predetermined periods during which preview images are generated (or the time length of the timer used when generating preview images), is stored in advance. A predetermined period (or time length of timer) associated with the selected item is set in the storage unit 258. The time length of the timer used when generating preview images is longest when "many" is selected, medium when "usual" is selected, and shortest when "less" is selected. For example, the time length of the timer may be set at 30 seconds in the case of "many", 20 seconds in the case of "usual", and 10 seconds in the case of "less". Note that the selection of "(5) Amount of preview images of second print language to be generated" may be set to any level other than the three levels indicated as examples above. Note that the setting of generating all of or some of the preview images and the amount of preview images to be generated may be set with respect to the first print language. However, in the case of the first print language, instead of setting the time length of the timer, the range (number of pages) of for which preview images are to be generated, is set as the amount of preview images to be generated. Furthermore, with respect to the first print language or the second print language, by selecting "some", a value (the number of pages or a predetermined period) that is specified in advance may be set. Here, a description is given assuming that, with respect to the setting of the amount of preview images to be generated, a value specified in advance (for example, 10 pages) is set for the first print language and a selected setting value is set for the second print language. Note that the value specified in advance for the first print language may be stored in the storage unit 258.

The preview image generating unit 262 includes a queue managing unit 262A and a generation processing unit 262B. The queue managing unit 262A includes a queue registration control unit 270. Furthermore, the generation processing unit 262B includes a process execution requesting unit 271 and a process executing unit 272.

The queue managing unit 262A manages the order of generating preview images, by using a process waiting queue in which information of a job is registered.

The queue registration control unit 270 performs processes of registering information of a job in a waiting queue and moving information of a job from a waiting queue to another waiting queue. Furthermore, when the number of process waiting queues managed by the queue managing unit 262A is one, the queue registration control unit 270 manages and moves the order of the information of a job within one process waiting queue.

The process execution requesting unit 271 manages the process of generating preview images by the process executing unit 272. The process of generating a preview image is activated for each job. The process execution requesting unit 271 instructs the process executing unit 272 to generate a preview image based on the information of a job acquired from the first place in the queue managed by the queue managing unit 262A. Furthermore, the process execution requesting unit 271 manages the execution time of each process by a timer, etc., and instructs the process executing unit 272 to end a process by which preview images have been generated for a predetermined time. The process executing unit 272 generates a preview image based on an instruction from the process execution requesting unit 271.

The preview image generating unit 262 executes various processes according to the settings of the setting items in FIG. 4.

For example, when the "(3) Maximum process number of preview image generation" in FIG. 4 is set as three, the process executing unit 272 of the preview image generating unit 262 is able to activate three processes at the same time. The process execution requesting unit 271 monitors the number of processes activated by the process executing unit 272, and when the number reaches three, the process execution requesting unit 271 does not give any more new instructions to generate preview images. When the number becomes less than three, the process execution requesting unit 271 acquires information of a job from the first place of the waiting queue managed by the queue managing unit 262A, and gives a new instruction to the process executing unit 272 to generate preview images.

The generation processing unit 262B determines whether the print data is in the first print language or the second print language, and when the print data is in the second print language, the generation processing unit 262B confirms the setting values of "(4) Preview image of second print language" and "(5) Amount of preview images of second print language to be generated" of FIG. 4, and sets the timer according to the setting values. Note that when "all" is selected in (4) of FIG. 4, the timer is set as "no limit (indefinite)" or a sufficiently long period that is conceivable (for example, 10 minutes).

The preview image generating unit 262 adjusts the order of assigning the processes of generating preview images corresponding to a plurality of print data items. This order is adjusted based on attributes of the job corresponding to the print data.

The preview image generating unit 262 may be configured to refer to the priority levels of users stored in the storage unit 258, and generate, with high priority, the preview image of a user having a high priority level. Furthermore, the preview image generating unit 262 may be configured to generate a preview image requested from the image forming apparatus 300 with higher priority than other preview images.

Note that the transmitting/receiving unit 252 transmits and receives jobs, preview images, and various kinds of data via the communication network 50.

The transmitting/receiving unit 252 is an example of a transmitter unit or a receiver.

As described above, in a pull printing method, there is a time lag from when a job is input to the server device 200 to when a user specifies and prints the job at the image forming apparatus 300. The method of generating a preview image by the server device 200 includes a first generating method and a second generating method.

In the first generating method, a process to generate a preview image is requested (or started) during the time lag. Therefore, the first generating method is advantageous in terms of responsiveness when a user requests a preview image at the image forming apparatus 300.

On the other hand, the preview images of all of or some of the jobs are generated at the same time by the first generating method. Therefore, for example, if the user prints the print data without previewing the data, the server device 200 would generate a preview image that is not used. Consequently, the process of generating the preview image becomes a wasteful process. In this regard, the first generating method is disadvantageous in that the load of the server device 200 becomes high.

Furthermore, for example, when a preview image of a job is generated by the second generating method, a process to generate a preview image is not started at the server device 200 when the job is input. Therefore, the load on the server device 200 as described above can be prevented from increasing. On the other hand, the second generating method may be disadvantages in terms of bad responsiveness because the generation of a preview image is started after a user requests a preview image at the image forming apparatus 300.

According to the first embodiment, it is possible to adjust and balance out the above advantages and disadvantages. Specifically, the user sets whether to use the first generating method or the second generating method for generating a preview image in the server device 200. Furthermore, the user sets the range of pages and the limitation in the generation time with respect to generating the preview image, etc., in the server device 200. Therefore, the server device 200 is able to efficiently generate a preview image. In addition, the user is able to flexibly set the method of generating a preview image and various parameters used in the generating method with respect to the server device 200. Accordingly, an appropriate method of generating preview images can be provided in accordance with the usage environment of the user.

(3) Functional Configuration of Client Device

Referring to FIG. 2, a description is given of a functional configuration of the client device 100 according to the first embodiment. The client device 100 includes a transmitting/receiving unit 152, an operation input accepting unit 154, and a print job generating unit 156.

The operation input accepting unit 154 accepts input of an operation from the user of the client device 100. For example, the operation input accepting unit 154 accepts an instruction to print predetermined data.

The print job generating unit 156 generates a job corresponding to data for which a printing instruction is received from the user by the operation input accepting unit 154. The print job generating unit 156 requests the transmitting/receiving unit 152 to send the generated job to the server device 200. Here, the print job generating unit 156 may generate a job including the identification information of the user and request the transmitting/receiving unit 152 to send the job, or the print job generating unit 156 may request the transmitting/receiving unit 152 to send the identification information of the user separately from the job.

The transmitting/receiving unit 152 receives the instruction from the print job generating unit 156, and sends the job to the server device 200. The transmitting/receiving unit 152 uses the communication network 50 to send the job.

(4) Functional Configuration of Image Forming Apparatus

Referring to FIG. 2, a description is given of a functional configuration of the image forming apparatus 300 according to the first embodiment. The image forming apparatus 300 includes a transmitting/receiving unit 352, an authentication processing unit 354, the operation accepting unit 356, a job list acquiring unit 358, a preview image generation requesting unit 360, a preview image acquiring unit 362, a print data acquiring unit 364, and a print processing unit 366.

The transmitting/receiving unit 352 transmits and receives various kinds of data with the server device 200 via the communication network 50.

The authentication processing unit 354 requests the authentication server 400 to authenticate the user. For example, the authentication processing unit 354 requests the user to input an ID and a password of the user in a login screen displayed on an operation panel 307.

The authentication processing unit 354 sends the ID and the password of the user to the authentication server 400 via the transmitting/receiving unit 352. Note that the authentication server 400 determines whether to allow the user to log in, according to whether a combination of the ID and the password of the user sent from the image forming apparatus 300, is stored.

The authentication process may be executed by using an information recording medium held by the user, such as a card including an IC card, etc., or a mobile terminal, instead of having the user input the ID and the password. In this case, for example, when the user holds an IC card over a card reader of the image forming apparatus 300, the card ID and the password stored in the card is input to the authentication processing unit 354, and the authentication server 400 determines whether the authentication is successful according to whether the combination of the card ID and the password is recorded.

Furthermore, the authentication processing unit 354 may execute the authentication of the user without using the authentication server 400. In this case, a combination of the ID and the password or a combination of the card ID and the password of the user who is allowed to use the image forming apparatus 300 is stored in the image forming apparatus 300. The authentication processing unit 354 executes the same authentication method as the authentication method executed by the authentication server 400.

The job list acquiring unit 358 acquires a list of jobs of a user who has logged in, from the server device 200.

The preview image generation requesting unit 360 sends signals requesting a preview image of the print data of a job selected from the list of jobs by the user, to the server device 200. Furthermore, the preview image generation requesting unit 360 sends a signal specifying a particular page and requesting a preview image of the specified page to the server device 200.

The preview image acquiring unit 362 acquires (receives), from the server device 200, a preview image of print data (or furthermore, a specified page) of a job selected from the list of jobs by the user.

The print processing unit 366 acquires print data of the job selected from the list of jobs by the user, and prints the acquired print data.

The operation accepting unit 356 accepts various kinds of input by the user and displays various kinds of information.

Referring to FIGS. 5A through 6B, a description is given of a screen displayed on the operation accepting unit 356.

A screen illustrated in FIG. 5A is displayed on the operation accepting unit 356 when authenticating a user. The user inputs an ID and a password of the user in the screen displayed on the operation accepting unit 356 and selects a displayed button indicating login, to log into the image forming apparatus 300. When the operation accepting unit 356 accepts that the displayed button indicating login is selected, the operation accepting unit 356 reports the input information to the authentication processing unit 354.

Figure 5B:
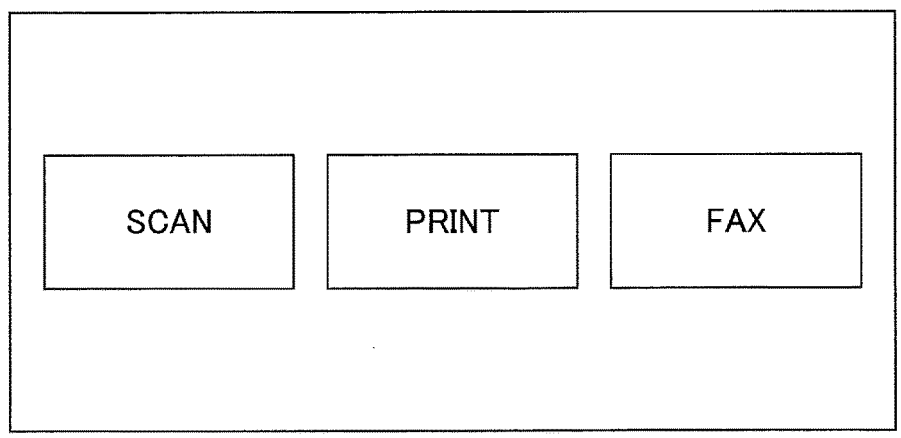

A screen illustrated in FIG. 5B indicates an example of a display screen when the user has successfully logged in and the user is selecting a function to be used. When it is detected that the user has selected print, the job list acquiring unit 358 starts a process of acquiring a list of jobs. Furthermore, the job list acquiring unit 358 may be configured to start a process of acquiring a list of jobs when the user has successfully logged in. The job list acquiring unit 358 acquires attribute information of a job corresponding to a user ID of a user who has logged in, among the jobs registered in the job table.

A screen illustrated in FIG. 6A is an example of a screen displaying a list of jobs of a user acquired by the job list acquiring unit 358. This example indicates a list of jobs of a user having a user name "user1". When the user selects a job and then selects a "preview" button, the preview image acquiring unit 362 acquires a preview image from the server device 200. Furthermore, when the item value of the item "whether to generate preview image" of the job selected by the user is "OFF", the "preview" button may be greyed out such that the user is unable to select the "preview" button.

Figure 6B:
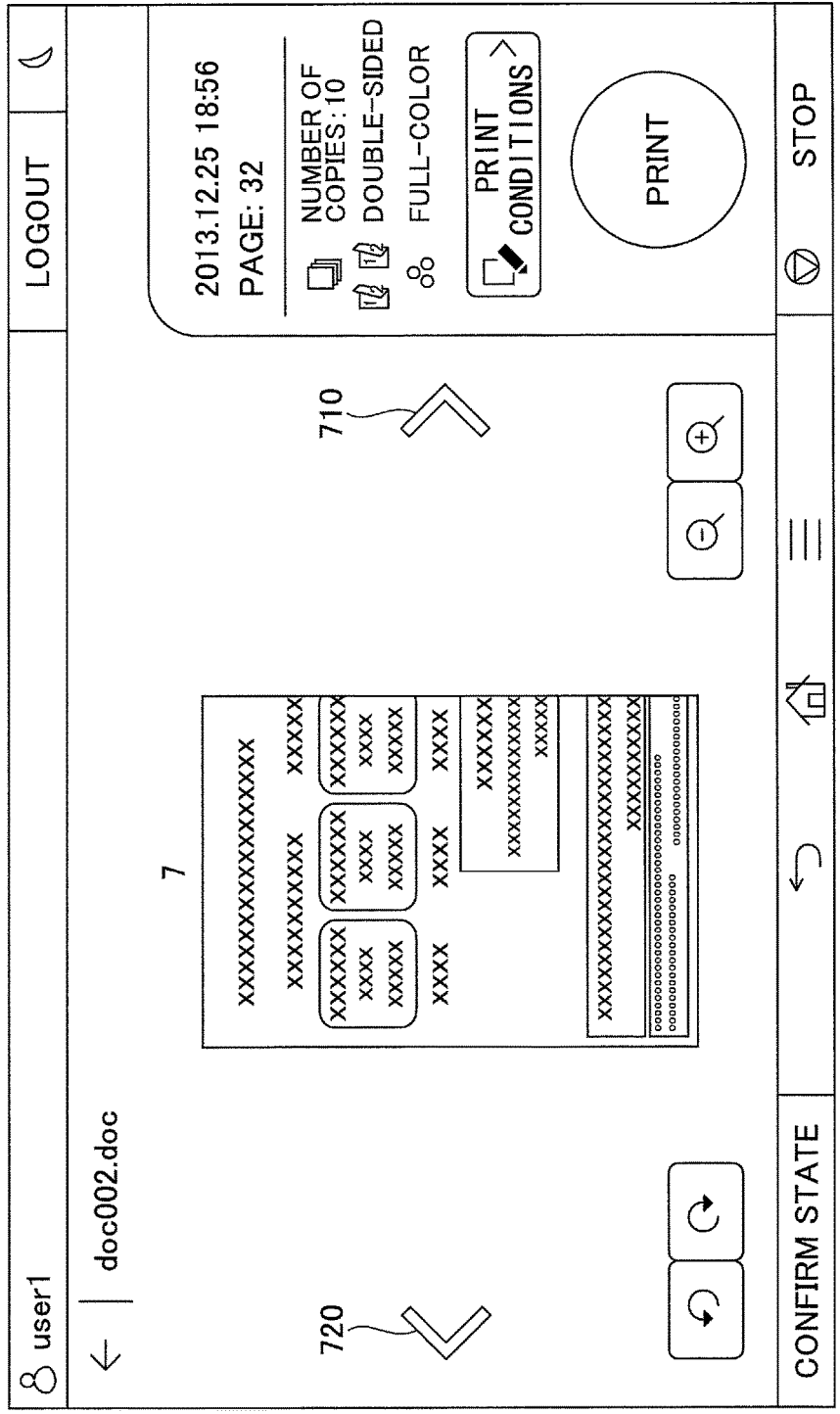

A screen illustrated in FIG. 6B is an example of a preview image acquired by the preview image acquiring unit 362. This screen is an example of a display screen that is displayed when the user selects a job "doc002.doc".

When the user selects an arrow 710, the preview image proceeds by one page, and when the user selects an arrow 720, the preview image returns by one page. When the user selects a preview image that is not acquired from the server device 200, the preview image acquiring unit 362 requests the server device 200 to send the corresponding preview image. When the server device 200 receives the request, but the requested preview image is not generated at the server device 200, the preview image generating unit 262 starts a process of generating the preview image in response to receiving the request. Note that the request includes at least the page number or the page range of the preview image that the user wants to display at present.

Note that in one example, the server device 200 generates a preview image of just the requested page and sends the generated preview image to the image forming apparatus 300. In another example, the server device 200 may generate preview images of pages within a predetermined range beyond the requested page, in addition to generating a preview image of the requested page. In this case, the server device 200 may send the generated preview image to the image forming apparatus 300 every time the generation of a preview image is completed. Alternatively, the server device 200 may send the generated preview images to the image forming apparatus 300 after the generation of all of the preview images of pages in a predetermined range is completed.

The convenience of the user is further increased by also generating preview images of pages in a predetermined range beyond the requested page, and sending the generated preview images to the image forming apparatus 300 in advance. In this case, when the user requests to confirm preview images beyond the requested preview image, the speed of displaying the preview image on the operation accepting unit 356 can be increased.

When the generation of the a preview image is not supported; for example, when "(1) Generate preview image" is set as "do not generate" in the server device 200, the image forming apparatus 300 does not display the button for selecting "preview" in FIG. 6A, or displays the "preview" button in FIG. 6A in a half-luminance state such that the user can recognize that it is not possible to use this function.

The operation accepting unit 356 is an example of a display. Furthermore, the preview image acquiring unit 362 is an example of a requester.

<Hardware Configuration>

(1) Client Device and Server Device

Figure 7:
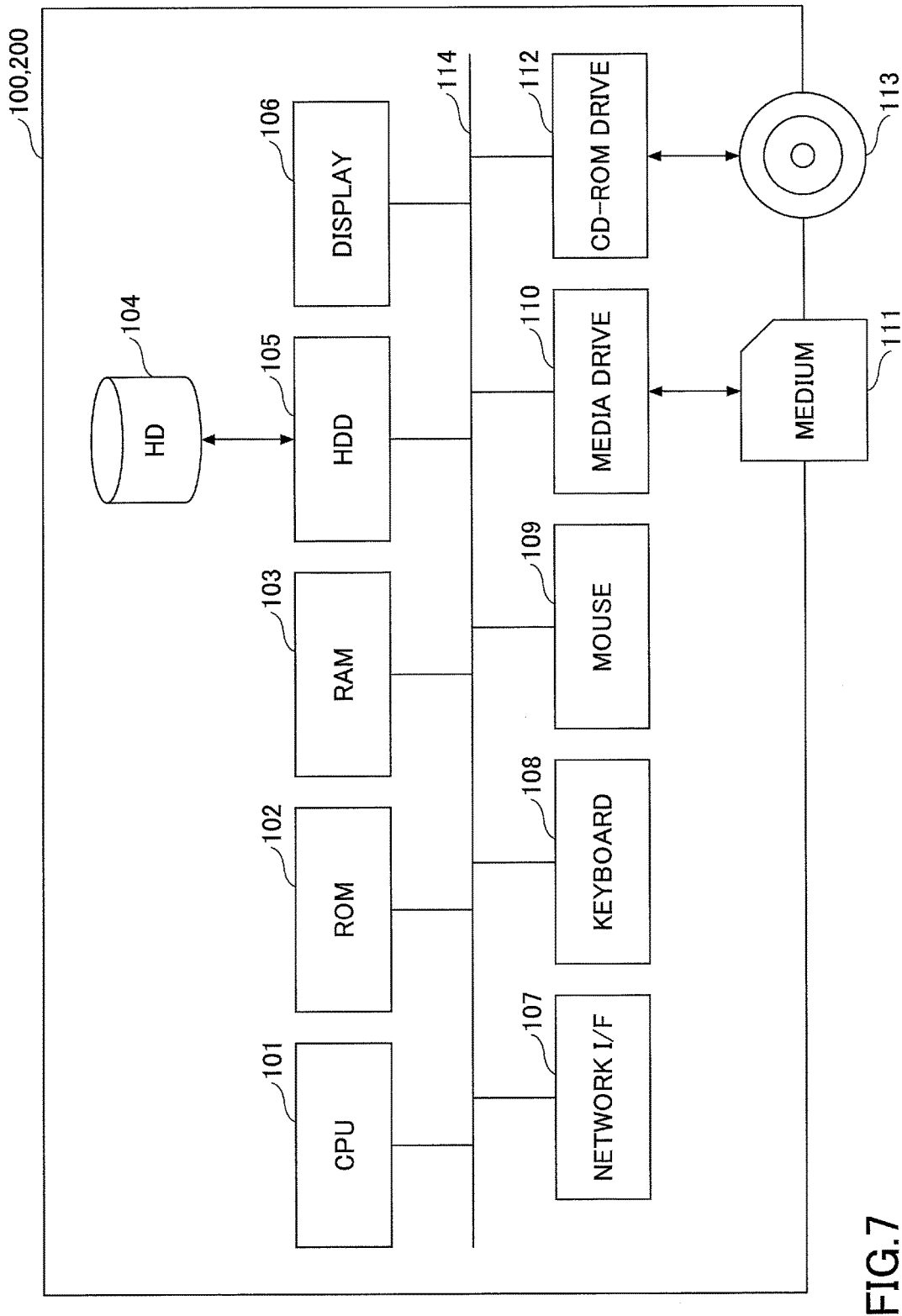
FIG. 7 is a block diagram illustrating a hardware configuration of a client device and a server device according to the first embodiment of the present disclosure.

FIG. 7 is a block diagram illustrating a hardware configuration of the client device 100 according to the first embodiment. The client device 100 includes a central processing unit (CPU) 101 for controlling operations of the entire client device 100, a Read-Only Memory (ROM) 102 storing programs used for driving the CPU 101, and a Random Access Memory (RAM) 103 used as a work area of the CPU 101. Furthermore, the client device 100 includes a hard drive (HD) 104 storing various kinds of data such as programs for the client device 100, and a HDD (Hard Disk Drive) 105 for controlling the reading or writing of various kinds of data with respect to the HD 104 according to control by the CPU 101.

Furthermore, the client device 100 includes a display 106 for displaying various kinds of information such as a cursor, a menu, a window, characters, and images, and a network interface (I/F) 107 for performing data communication by using the communication network 50. Furthermore, the client device 100 includes a keyboard 108 including a plurality of keys for inputting characters, values, and various instructions, etc., and a mouse 109 for selecting and executing various instructions, selecting a processing target, and moving the cursor, etc. Furthermore, the client device 100 includes a media drive 110 for controlling the reading or the writing (storing) of data with respect to a recording medium 111 such as a flash memory. Furthermore, the client device 100 includes a Compact Disc Read-Only Memory (CD-ROM) drive 112 for controlling the reading or the writing of various kinds of data with respect to a CD-ROM 113, which is an example of a removable recording medium. Furthermore, the client device 100 includes a bus line 114 such as an address bus or a data bus, etc., for electrically connecting the above elements as illustrated in FIG. 7.

Various functions of the client device 100 illustrated in FIG. 2 are realized as the CPU 101 reads and executes the programs stored in the ROM 102, etc.

Meanwhile, the server device 200 has the same hardware configuration as the hardware configuration of the client device 100 described above, and therefore overlapping descriptions are omitted. However, the HD 104 stores various kinds of data such as programs, etc., for controlling the server device 200.

Various functions of the server device 200 illustrated in FIG. 2 are realized as the CPU 101 reads and executes programs stored in the ROM 102, etc.

(2) Image Forming Apparatus

Figure 8:
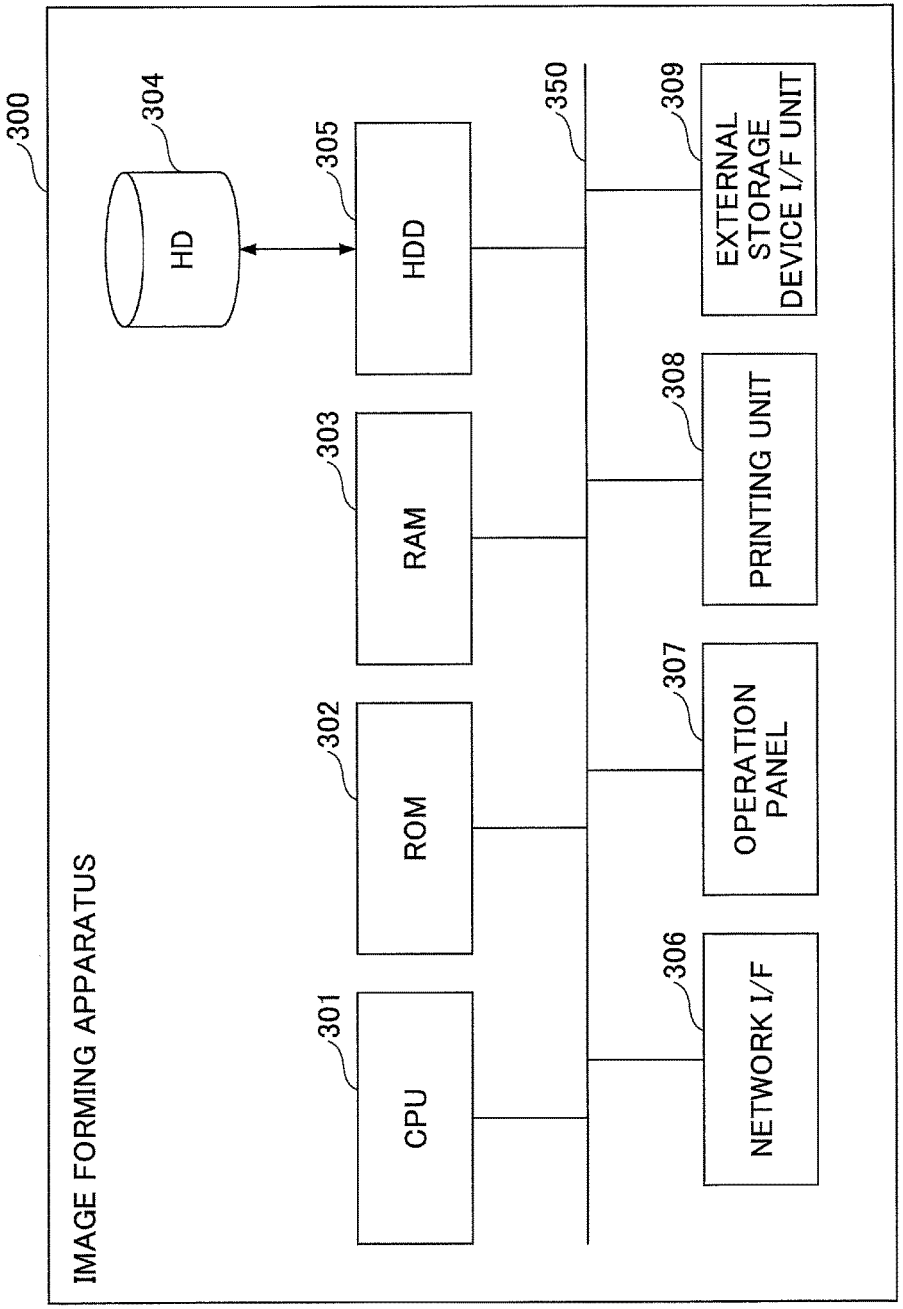
FIG. 8 is a block diagram illustrating a hardware configuration of the image forming apparatus according to the first embodiment of the present disclosure.

FIG. 8 is a block diagram illustrating a hardware configuration of the image forming apparatus 300 according to the first embodiment. The image forming apparatus 300 includes a CPU 301 for controlling operations of the entire image forming apparatus 300, a ROM 302 storing programs used for driving the CPU 301, and a RAM 303 used as a work area of the CPU 301. Furthermore, the image forming apparatus 300 includes a HD 304 storing various kinds of data such as image data, document data, programs, font data, form data, and programs for the image forming apparatus 300, etc., and a HDD 305 for controlling the reading or writing of various kinds of data with respect to the HD 304 according to control by the CPU 301.

Furthermore, the image forming apparatus 300 includes a network I/F 306 for performing data communication by using a network. Furthermore, the image forming apparatus 300 includes the operation panel 307 including a plurality of keys for displaying various kinds of information such as a menu, a window, characters, and images, and for inputting characters, values, and various instructions, etc. Furthermore, the image forming apparatus 300 includes a printing unit 308 for performing various printing processes according to operation contents of the operation panel 307. Furthermore, the image forming apparatus 300 includes an external storage device I/F unit 309 that is an interface unit for connecting the image forming apparatus 300 with an external storage medium such as a Universal Serial Bus (USB) flash memory, Smart Media (registered trademark), Compact Flash (registered trademark), a Secure Digital (SD) memory card (registered trademark), a mini SD (registered trademark) card, a micro SD (registered trademark) card, a memory stick (registered trademark), and an xD Picture Card (registered trademark). Furthermore, the image forming apparatus 300 includes a bus line 350 such as an address bus or a data bus, etc., for electrically connecting the above elements as illustrated in FIG. 8.

Various functions of the image forming apparatus 300 illustrated in FIG. 2 are realized as the CPU 301 reads and executes programs stored in the ROM 302, etc.

<Operation Procedures>

Referring to FIGS. 9 through 13, a description is given of operation procedures relevant to the generation of preview images.

Figure 9:
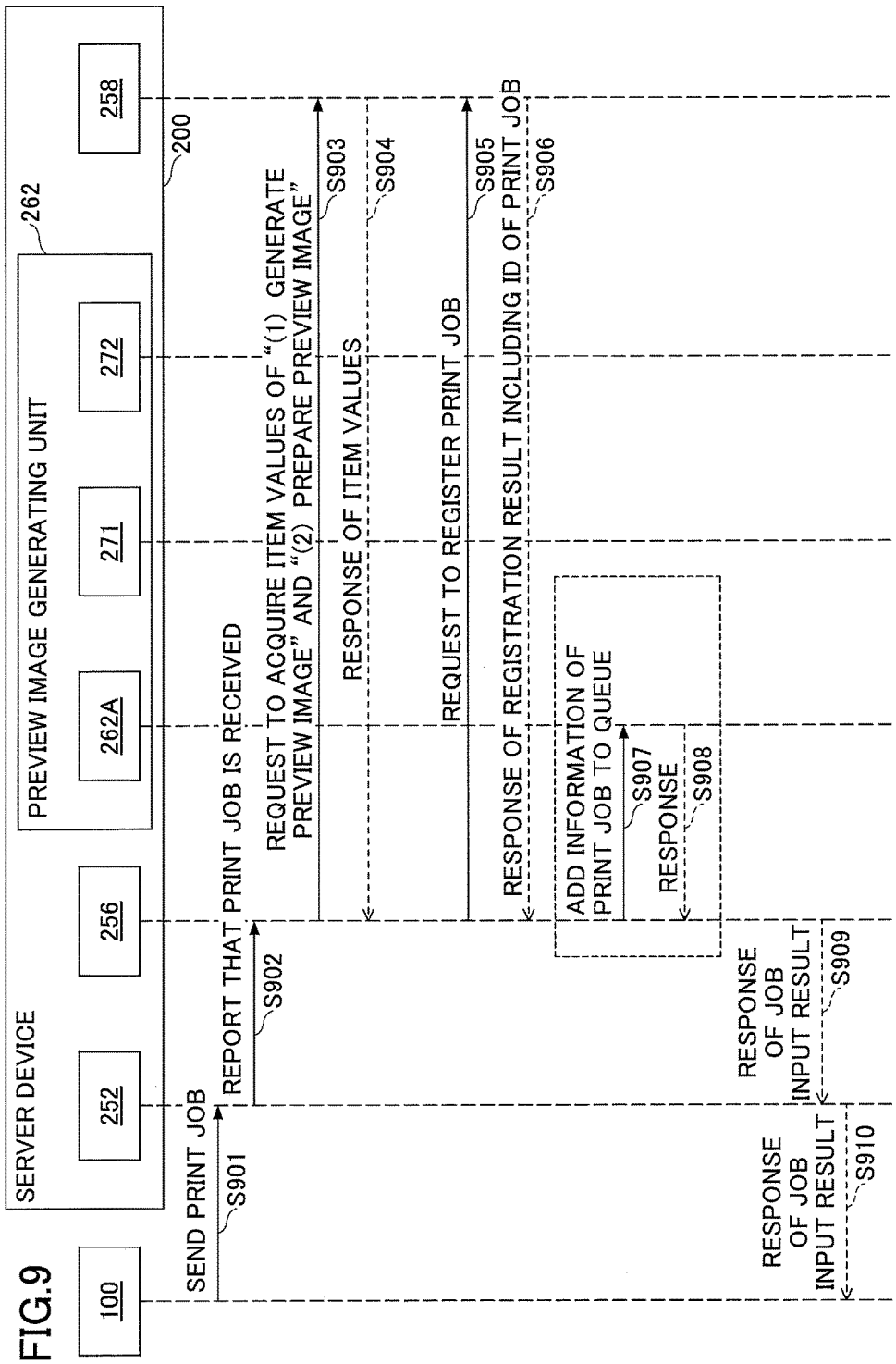
FIG. 9 is a sequence diagram illustrating an example of operation procedures of generating a preview image according to the first embodiment of the present disclosure.
Figure 10:
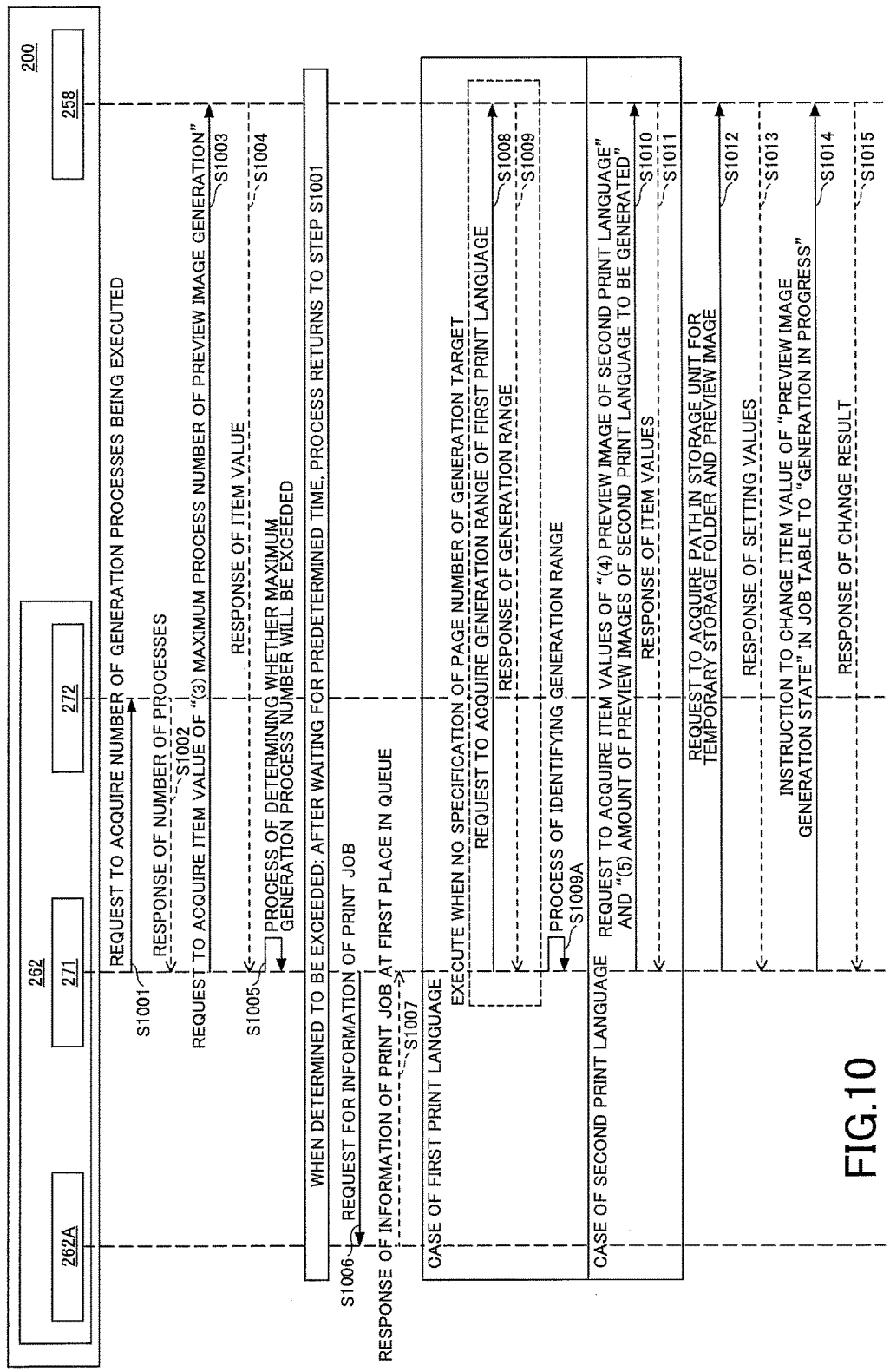
FIG. 10 is a sequence diagram illustrating an example of operation procedures of generating a preview image according to the first embodiment of the present disclosure.
Figure 11:
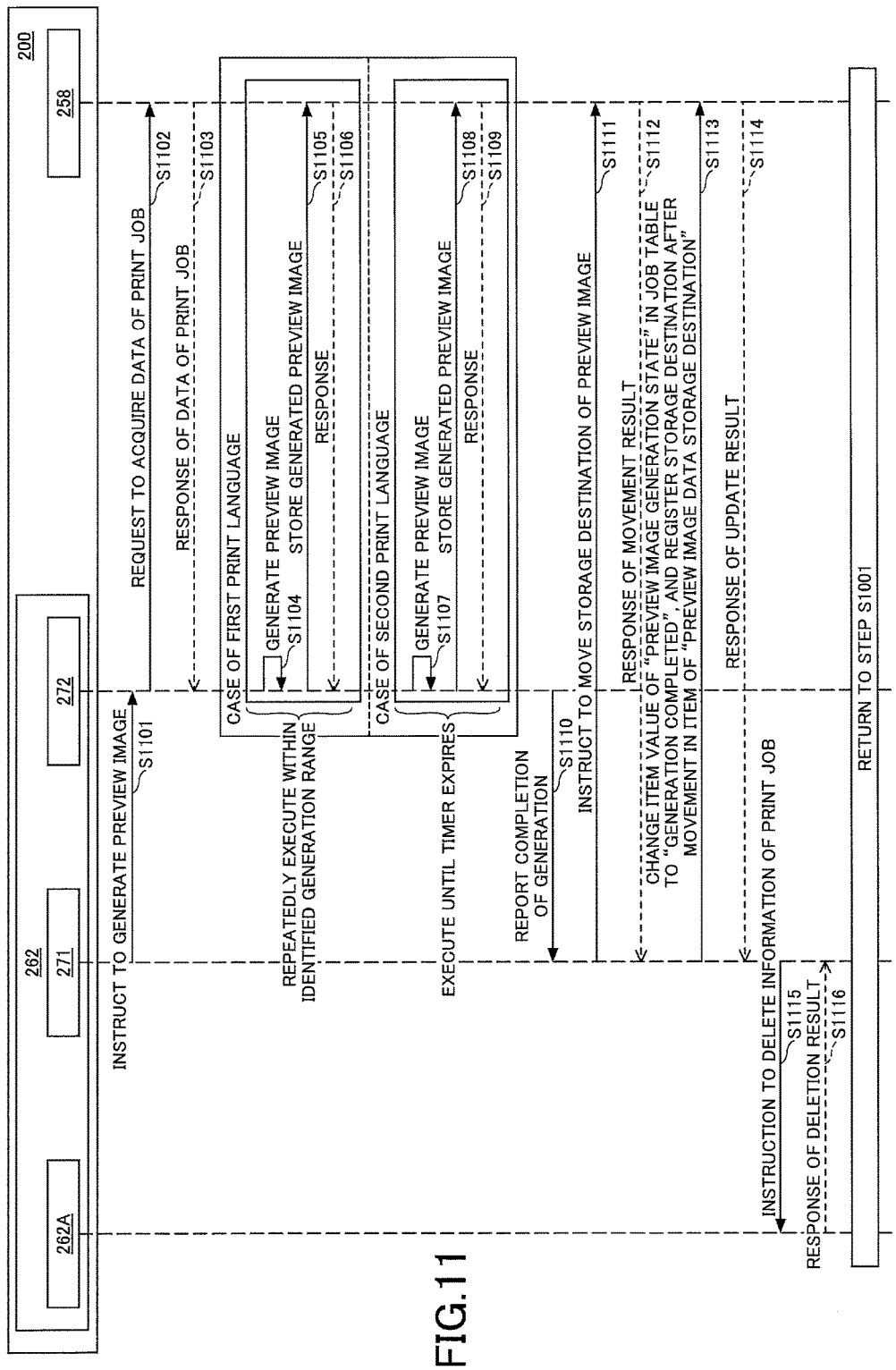
FIG. 11 is a sequence diagram illustrating an example of operation procedures of generating a preview image according to the first embodiment of the present disclosure.

FIGS. 9 through 11 are sequence diagrams illustrating examples of operation procedures of generating a preview image when the server device 200 receives a job from the client device 100. FIG. 9 is a sequence diagram illustrating an example of operation procedures, from when a job is received from the client device 100 to when information of the job is registered in a queue.

In step S901, the transmitting/receiving unit 252 receives a print job sent from the client device 100.

In step S902, the transmitting/receiving unit 252 reports to the control unit 256 that a job has been received.

In step S903, the control unit 256 sends a request to acquire the item values of "(1) Generate preview image" and "(2) Prepare preview image", to the storage unit 258.

In step S904, the control unit 256 receives a response including the item values, from the storage unit 258.

In step S905, the control unit 256 sends a request to register a job, to the storage unit 258.

The storage unit 258 analyzes the job included in the registration request, acquires information such as the name of the job, an identifier of the user who has input the job (user ID), the time and date when the job is input, the print language of the job, and attributes relevant to printing, etc., and stores the print data included in the job in a predetermined storage destination. The storage unit 258 registers the acquired information such as attributes relevant to printing, etc., and the storage destination of the print data, in a job table. At this time, a job ID for uniquely identifying the job is assigned. Furthermore, when the item value of the setting item "(1) Generate preview image" is set as "do not generate", the storage unit 258 sets "OFF" as the item value of "whether to generate preview image" in the job table. When the item value of the setting item "(1) Generate preview image" is set as "generate", the storage unit 258 sets "ON" as the item value of "whether to generate preview image" in the job table, and sets "before generation" as the item value of "preview image generation state".

In step S906, the control unit 256 receives a response of the registration result including the ID of the print job, from the storage unit 258.

When the item value of "(1) generate preview image" is "generate" and the item value of "(2) prepare preview image" is "prepare", the operation procedures of steps S907 and S908 are executed.

In step S907, the control unit 256 instructs the queue managing unit 262A to add the information of the job to the queue.

The queue managing unit 262A receives the instruction from the control unit 256 and adds the information of the job to the last place in the queue. The information of the job includes the job ID, the print language of the job, the storage destination of the print data, and the generation target page number. These information items are added to a queue table that is a table for managing the queue. The queue managing unit 262A uses the queue table to manage the order of generating preview images.

Note that when a preview image is generated when a job is input, the generation target page number does not have to be registered (or "blank" is registered).

FIG. 12 is a diagram illustrating an example of a queue table. The queue table stores a job ID, the print language, the storage destination of print data, and the generation target page number in association with each other.

As the job ID, identification information of a job that is a target for generating a preview image is stored. As the print language, identification information of the print language of the job is stored. These information items are acquired when the job is analyzed.

The process execution requesting unit 271 acquires information of the job from the first place in the queue table, and instructs the process executing unit 272 to generate a preview image.

When the queue managing unit 262A includes a plurality of queues having different priority levels ("regular queue" and "priority queue"), the control unit 256 may instruct the queue to which the job is to be added. For example, when generating a preview image in response to receiving a job sent from the client device 100, the information of the job is added to the "regular queue". According to the instruction, the queue managing unit 262A performs the process of registering the information of the job to the queue.

In step S908, the queue managing unit 262A sends a response to the control unit 256. The response includes a report that the information of the print job has been added to a queue.

In step S909, the control unit 256 sends a response indicating the job input result to the transmitting/receiving unit 252.

In step S910, the transmitting/receiving unit 252 sends the response indicating the job input result to the client device 100.

Next, referring to FIG. 10, a description is given of operation procedures from when the information of a job is registered in a queue to when a process of generating a preview image is started.

In step S1001, the process execution requesting unit 271 sends a request to acquire the number of processes being executed for generating a preview image, to the process executing unit 272.

In step S1002, the process executing unit 272 sends a response indicating the number of processes, to the process execution requesting unit 271.

In step S1003, the process execution requesting unit 271 sends a request to acquire the item value of "(3) Maximum process number of preview image generation", to the storage unit 258.

In step S1004, the storage unit 258 sends the item value to the process execution requesting unit 271.

In step S1005, the process execution requesting unit 271 performs a process of determining whether the maximum process number will be exceeded, when a new process for generating a preview image is started.

When the process execution requesting unit 271 determines that the maximum process number will be exceeded, after waiting for a predetermined time, the process returns to step S1001. When the process execution requesting unit 271 determines that the maximum process number will not be exceeded, the process of step S1006 and onward including the processes indicated in FIG. 11 are executed.

In step S1006, the process execution requesting unit 271 sends a request for information of a job, to the queue managing unit 262A.

In step S1007, the queue managing unit 262A sends, as a response, the information of a job acquired from the first place of the queue, to the process execution requesting unit 271.

When the print language identified from the information of the job is the first print language, steps S1008 through S1009A are executed.

The operation procedures of steps S1008 and S1009 are executed when the information of the job acquired by the process execution requesting unit 271 does not include any specification of page numbers to be a target for generating a preview image, or when the value is "blank".

In step S1008, the process execution requesting unit 271 sends a request to acquire the generation range of the first print language, to the storage unit 258.

In step S1009, the storage unit 258 sends a response indicating the generation range of the first print language, to the process execution requesting unit 271. In the generation range, a page range such as page 1 through page 10, etc., is set.

In step S1009A, when the acquired information of the job does not include any specification of page numbers to be a target for generating a preview image, the process execution requesting unit 271 identifies the generation range acquired in step S1009 as the generation range of the preview image. On the other hand, when the acquired information of the job includes a specification of page numbers to be a target for generating a preview image, the process execution requesting unit 271 identifies the specified pages as the generation range.

When the print language identified from the information of the job is the second print language, steps S1010 and S1011 are executed.

In step S1010, the process execution requesting unit 271 sends a request to acquire the item values of "(4) Preview image of second print language" and "(5) Amount of preview images of second print language to be generated", to the storage unit 258.

In step S1011, the storage unit 258 sends a response including the item values, to the process execution requesting unit 271.

In step S1012, the process execution requesting unit 271 sends a request to acquire the path (route path) in the storage unit 258 for the temporary storage folder and the storage folder of the preview image, to the storage unit 258.

In step S1013, the storage unit 258 sends the setting value, i.e., the information of the path, to the process execution requesting unit 271.

In step S1014, the process execution requesting unit 271 sends an instruction to change the item value of the "preview image generation state" in the job table to "generation in progress", to the storage unit 258.

In step S1015, the storage unit 258 sends a response indicating the change result, to the process execution requesting unit 271.

Next, referring to FIG. 11, a description is given of operation procedures of the process of generating a preview image.

In step S1101, the process execution requesting unit 271 sends an instruction to generate a preview image, to the process executing unit 272. The generation instruction includes information of a job.

In step S1102, the process executing unit 272 sends a request to acquire data of a print job, to the storage unit 258.

In step S1103, the storage unit 258 sends the data of the print job as a response.

For example, the process executing unit 272 sends the job ID of the print job to the storage unit 258, and the storage unit 258 sends a response including data of the print job corresponding to the job ID that has been sent from the process executing unit 272.

When the job is generated in the first print language, the processes of steps S1104 through S1106 are executed. On the other hand, when the job is generated in the second print language, the processes of steps S1107 through S1109 are executed.

First, a description is given of a case where the job is generated in the first print language.

In step S1104, the process executing unit 272 generates a preview image. Specifically, the process executing unit 272 generates a preview image of pages within the generation range identified in step S1009A.

In step S1105, the process executing unit 272 sends the generated preview image to the storage unit 258. The storage unit 258 stores the received preview image.

In step S1106, the generation processing unit 262B receives a response indicating that the preview image has been stored, from the storage unit 258.

Next, a description is given of a case where the job is generated in the second print language.

In step S1107, the process executing unit 272 generates a preview image. The process executing unit 272 activates a timer used when generating preview images at the timing of starting to generate a preview image, and when the timer expires, the process executing unit 272 ends the process of generating a preview image.

When the generation of the preview image of the print data is completed before the timer expires, the process of generating the preview image ends at the time point when the generation is completed. The setting value of the timer is determined by the process execution requesting unit 271 based on the setting values of "(4) Preview image of second print language" and "(5) Amount of preview images of second print language to be generated" acquired in steps S1010 and S1011, and the determined setting values are reported to the process executing unit 272. For example, when the setting value of "(4) Preview image of second print language" is "all", the process execution requesting unit 271 determines the setting value of the timer to be a predetermined length of time. When the setting value of "(4) Preview image of second print language" is "some", the process execution requesting unit 271 determines the setting value of the timer to be a length of time according to the setting value of "(5) Amount of preview images of second print language to be generated". Furthermore, when the setting value of "(4) Preview image of second print language" is "all", the process execution requesting unit 271 does not have to set the timer. In this case, the process execution requesting unit 271 instructs the process executing unit 272 to repeatedly execute the processes of steps S1107 through S1109 until the generation of preview images of all pages is completed.

In step S1108, the process executing unit 272 sends the preview images generated within a predetermined period, to the storage unit 258. The storage unit 258 stores the received preview images. At this time, the process executing unit 272 sends the preview images to the temporary folder named by the job ID in the route path of the temporary folder acquired in steps S1012 and S1013. Furthermore, when there is no temporary folder, the process executing unit 272 may generate a temporary folder. Here, the process executing unit 272 generates a file name of the image data corresponding to the page number of the generated preview image. For example, the image data may be named by the page number.

In step S1109, the generation processing unit 262B receives a response indicating that the preview images have been stored, from the storage unit 258.

In step S1110, the process executing unit 272 sends a report indicating the completion of the generation of the preview images, to the process execution requesting unit 271.

In step S1111, the process execution requesting unit 271 sends an instruction to move the storage destination of the preview images, to the storage unit 258. Specifically, the process execution requesting unit 271 sends an instruction to move the preview images stored in the temporary storage folder to a predetermined storage folder in the preview image data storage unit 258c (for example, a folder having a high security level). At this time, the process executing unit 272 sends the preview images to a folder named by the job ID in the route path of the storage unit 258 of the preview images acquired in steps S1012 and S1013. Here, when there is no folder, the process executing unit 272 may generate a folder. Furthermore, the process execution requesting unit 271 may send the instruction to move the preview images after performing an encryption process on the generated preview images.

In step S1112, the storage unit 258 sends a response indicating the movement result, to the process execution requesting unit 271.

In step S1113, the process execution requesting unit 271 instructs the storage unit 258 to change the item value of "preview image generation state" in the job table to "generation completed". Furthermore, the process execution requesting unit 271 instructs the storage unit 258 to register the storage destination after the preview images have been moved, in the item of "preview image data storage destination" in the job table.

In step S1114, the storage unit 258 sends a response indicating the update result, to the process execution requesting unit 271.

In step S1115, the process execution requesting unit 271 sends an instruction to delete the information of the print job, to the queue managing unit 262A.

In step S1116, the queue managing unit 262A sends the deletion result to the process execution requesting unit 271.

Figure 13:
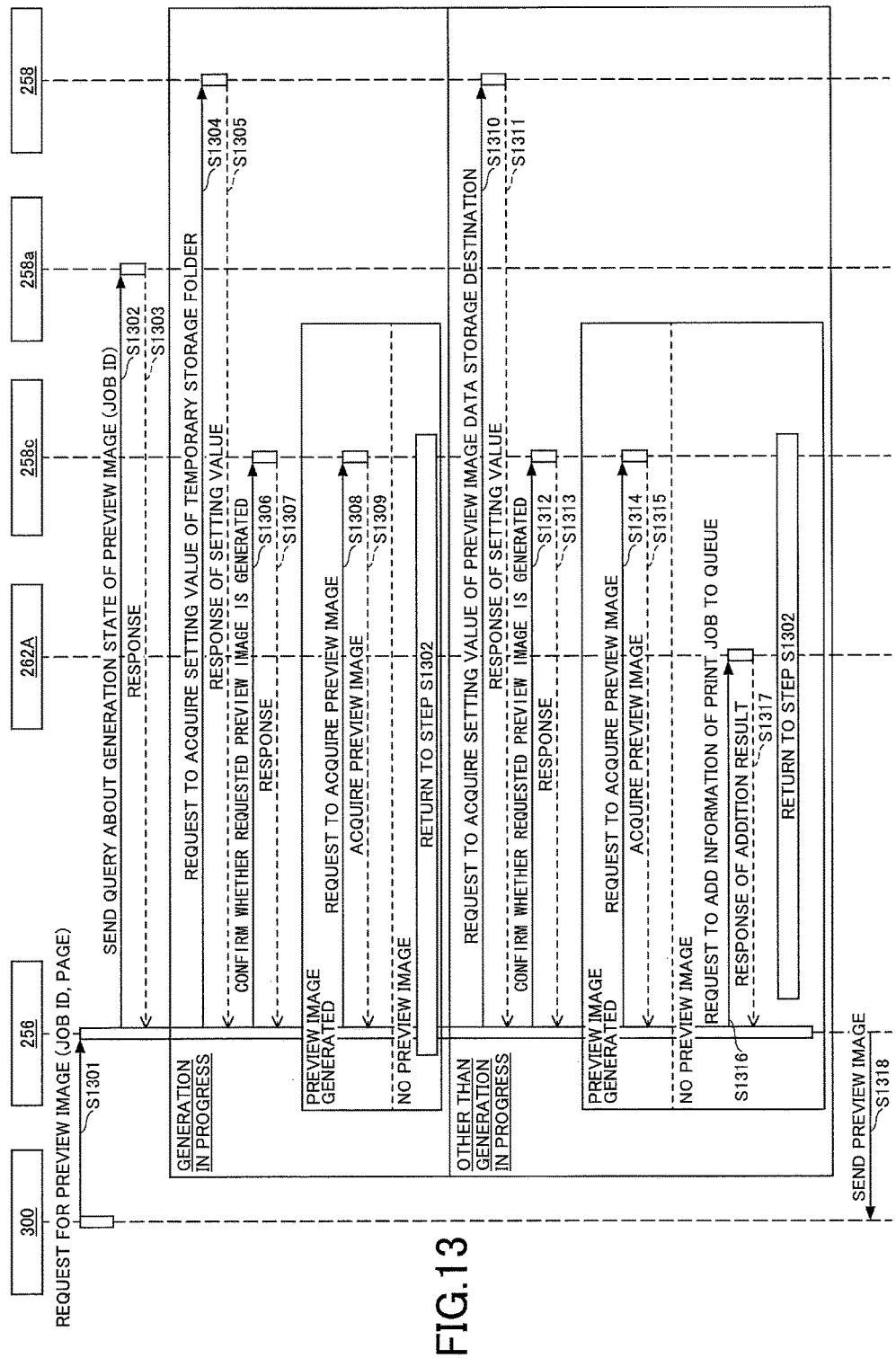
FIG. 13 is a sequence diagram illustrating an example of operation procedures of generating a preview image according to the first embodiment of the present disclosure.

FIG. 13 is a sequence diagram illustrating an example of operation procedures of generating a preview image in response to a request from the image forming apparatus 300.

In step S1301, when the user gives an instruction for preview an image in the screen of FIG. 6A, a request for a preview image is sent to the server device 200, and the control unit 256 receives the request for a preview image via the transmitting/receiving unit 252. The request includes a job ID. Furthermore, the request may also include the page number of print data for which a preview image is requested. In the following description, it is assumed that the requested page number of the print data is included in the request for a preview image.

In step S1302, the control unit 256 sends a query to the job table storage unit 258a about the generation state of the preview image. The query includes a job ID.

In step S1303, the control unit 256 receives a response from the job table storage unit 258a. The response includes information indicating the generation state of the preview image, such as "before generation", "generation in progress", and "generation completed". When the job table storage unit 258a stores information relevant to the page of the print data for which a preview image is being generated, the response may include information relevant to the page. In this case, for example, information such as "preview images corresponding to page 1 to page 10 have been generated" is included.

First, a description is given of a case of "generation in progress". When the preview image is in the state of "generation in progress", the processes of steps S1304 through S1309 are executed.

In step S1304, the control unit 256 sends a request to acquire a setting value of the temporary folder in the storage destination of the preview image, to the storage unit 258.

In step S1305, the storage unit 258 sends a response indicating the setting value, to the control unit 256. Accordingly, the control unit 256 is able to acquire the path to the temporary folder in the storage unit 258.

In step S1306, the control unit 256 sends, to the preview image data storage unit 258c, a signal for confirming whether there is image data of the requested preview image in the temporary storage folder named by the job ID under the acquired route path. The signal for confirmation includes information relevant to the page number for which a preview image has been requested. Here, the control unit 256 confirms whether the temporary storage folder includes an image file named by the requested page number.

In step S1307, the control unit 256 receives a response from the preview image data storage unit 258c. The response includes information indicating whether there is image data of the requested preview image.

When there is image data of the preview image, the processes of steps S1308 and S1309 are executed.

In step S1308, the control unit 256 sends a request to acquire the preview image to the temporary storage folder in the preview image data storage unit 258c. The acquisition request includes the job ID and information relevant to the page number for which a preview image is requested. Here, the acquisition request includes the file name of the image data corresponding to the requested page number.

In step S1309, the control unit 256 acquires image data of the preview image returned from the temporary storage folder of the preview image data storage unit 258c.

When there is no image data of a preview image, the process returns to step S1302.

As described above, in the state of "generation in progress", the control unit 256 executes a process of confirming whether a preview image has been generated, at predetermined cycles. Furthermore, all of the preview images to be generated in the job being confirmed may have been generated between the predetermined cycles. That is, the generation state of preview images may have been changed from "generation in progress" to "generation completed". In this case, the setting value of "generation completed" is acquired in step S1302, and therefore the process is continued from step S1310.

Next, a description is given of cases other than when the preview image is in a state of "generation in progress". In this case, the processes of step S1310 and onward are executed.

In step S1310, the control unit 256 sends a request to acquire a setting value of the preview image data storage unit 258c, to the storage unit 258.

In step S1311, the storage unit 258 sends a response indicating the setting value to the control unit 256.

Accordingly, the control unit 256 is able to acquire the path of the storage destination of the preview image in the preview image data storage unit 258c.

In step S1312, the control unit 256 sends a signal for confirming whether image data of the requested preview image is included in the folder named by the job ID, in the acquired path of the preview image data storage unit 258c. The signal for confirmation includes information relevant to the page number for which a preview image is requested. Here, the control unit 256 confirms whether there is an image file named by the requested page number, in the folder.

In step S1313, the control unit 256 control unit 256 receives a response. The response includes information indicating whether there is image data of the requested preview image.

The control unit 256 receiving a response indicating that there is image data, means that the requested preview image has already been generated by the preview image generating unit 262. The requested preview image already being generated, means that, for example, a preview image of the predetermined range has been generated when a job has been received from the client device 100 as described above, and therefore the requested preview image has already been generated. Accordingly, even when the generation state of the preview image of the job is "generation completed", all of the preview images of the print data may not necessarily be generated. On the other hand, the control unit 256 receiving a response indicating that there is no image data, or the control unit 256 receiving a response indicating that there is no folder named by the job ID, means that a preview image has not been generated.

When the image data of the requested preview image has already been generated, the processes of steps S1314 and S1315 are executed.

In step S1314, the control unit 256 sends a request to acquire the preview image, to the above-described folder in the preview image data storage unit 258c. The acquisition request includes the job ID and information relevant to the requested page. Here, the file name of the image data corresponding to the requested page number is included.

In step S1315, the control unit 256 acquires image data of the preview image returned from the above-described folder in the preview image data storage unit 258c.

Next, a description is given of a case where a preview image is not yet generated, for example, a case where the generation state of a preview image is "before generation" or a case where the generation state of a preview image is "generation completed" but a preview image of the requested page is not generated. In step S1316, the control unit 256 sends a request to add, to a queue, the information of the job for which a preview image is requested, to the queue managing unit 262A. At this time, when the print language of the job is the first print language, the information of the job is registered in the queue table by specifying the requested page number as the "generation target page number". On the other hand, when the print language of the job is the second print language, the requested page number is not registered as the "generation target page number".

Here, there is a high possibility that a request to generate a preview image has been received from the image forming apparatus 300, that is, the user is waiting for a preview image to be displayed on the operation accepting unit 356 of the image forming apparatus 300. Therefore, the control unit 256 instructs the queue managing unit 262A to perform the process of adding the information to the queue with high priority. For example, the control unit 256 may instruct the queue managing unit 262A to add the information of the job to the first place in the queue. Alternatively, the control unit 256 may send information indicating to perform the process with high priority to the queue managing unit 262A, and the queue managing unit 262A may adjust the order based on the received information.

In step S1317, the queue managing unit 262A adds the information of the job to the queue, and sends a response indicating the addition result to the control unit 256.

Next, the process returns to step S1302. In this manner, the requested preview image is generated by the operation procedures of FIGS. 10 and 11. Here, when the job is in the first print language, the requested page number is registered as the "generation target page number", and therefore in step S1009A, the registered page number is identified as the generation range of the preview image. As a result, a preview image of just the requested page is generated, and a quick response can be returned to the user requesting to view a preview image.

Finally, in steps S1308 and S1309 or in step S1314 and S1315, the control unit 256 acquires the preview image and sends the preview image to the image forming apparatus 300 via the transmitting/receiving unit 252 in step S1318. Note that when the second language is used and the requested preview image is not generated, the control unit 256 sends an error report indicating that a preview image is not generated, to the image forming apparatus 300 via the transmitting/receiving unit 252.

After executing the above processes, the server device 200 sends the preview image to the image forming apparatus 300.

Note that the control unit 256 or the process execution requesting unit 271 may acquire setting information such as setting items of the process relevant to generating a preview image, and settings of the temporary storage folder and the preview image data storage unit 258c, from the storage unit 258 at a predetermined timing (for example, when the system is activated), and store the acquired information. Furthermore, when the setting information is changed, the control unit 256 or the process execution requesting unit 271 may acquire the information according to an instruction from the user (for example, an instruction of rebooting the system).

Second Embodiment (1) Overview of Second Embodiment

Next, a description is given of a second embodiment. Descriptions of parts that are common to the first embodiment are omitted, and the different parts are described.

The generation of a preview image may cause a high load on the server device 200. Therefore, the process of generating a preview image is to be executed when the load of the server device 200 is low.

The server device 200 according to the second embodiment includes the transmitting/receiving unit 252 for receiving jobs from the client device 100, the preview image generating unit 262 for generating a preview image based on print data included in a job, the storage unit 258 for storing print data of a received job, and the transmitting/receiving unit 252 for sending the generated preview image to the image forming apparatus 300. The preview image generating unit 262 includes the queue managing unit 262A and the generation processing unit 262B. The queue managing unit 262A includes the queue registration control unit 270, and the generation processing unit 262B includes the process execution requesting unit 271 and the process executing unit 272. These functions execute the same processes as the processes of the first embodiment.

In the server device 200, the preview image generating unit 262 monitors the load the server device 200, and generates a preview images when the load is less than or equal to the first threshold.

A description is given of an example where the first threshold is that the utilization of the CPU 101 is 10%. The process execution requesting unit 271 monitors the utilization of the CPU 101. When the utilization becomes less than or equal to 10%, the process execution requesting unit 271 may acquire data of a job from a queue of the queue managing unit 262A, and execute the process of generating a preview image. Here, the process execution requesting unit 271 may periodically monitor the utilization of the CPU 101. For example, the process execution requesting unit 271 may monitor the utilization of the CPU 101 in cycles of 5 seconds, 10 seconds, or 30 seconds, etc.

Note that when the process execution requesting unit 271 acquires information of a job from a queue of the queue managing unit 262A, the process execution requesting unit 271 deletes the acquired information of a job from the queue, and instructs to update the order of assigning the information of a job to a process for generating a preview image.

The preview image generating unit 262 may monitor the load of the server device 200, and stop the process of generating a preview image when the load becomes higher than or equal to a second threshold.

A description is given of an example where the second threshold is that the utilization of the CPU 101 is higher than or equal to 80%. The process execution requesting unit 271 monitors the utilization of the CPU 101. When the utilization becomes higher than or equal to 80%, the process execution requesting unit 271 executes a process of stopping the process of generating preview images being executed. The process of stopping the generation process may be expressed as "killing the process".

When the process is stopped, the preview images that have been generated until the process is stopped are stored in the storage unit 258. At this time, the generation state of preview images of the job stored in the storage unit 258 is updated to "generation incomplete" from "generation in progress". The print data corresponding to the preview images that have not been generated, is registered again in the queue managing unit 262A.

When the utilization of the CPU 101 drops below the first threshold, the process execution requesting unit 271 acquires print data corresponding to the process that has been stopped in the middle of the process, from the queue managing unit 262A, and resumes the generation of preview images. When the generation of preview images is resumed, the generation state of preview images of the job stored in the storage unit 258 is updated to "generation in progress" from "generation incomplete".

The process execution requesting unit 271 may determine whether to start and stop the process of generating preview images, by using the memory utilization of the server device 200, in addition to the utilization of the CPU 101.

For example, a third threshold is that the memory utilization is 1 GB, and a fourth threshold is that the memory utilization is 3 GB. These thresholds are stored in the process execution requesting unit 271.

For example, when the utilization of the CPU 101 is less than or equal to the first threshold and the memory utilization is less than or equal to the third threshold, the process execution requesting unit 271 starts generating preview images.

For example, when the utilization of the CPU 101 is higher than or equal to the second threshold and the memory utilization is higher than or equal to the fourth threshold, the process execution requesting unit 271 stops generating preview images.

For example, the process execution requesting unit 271 may determine to start and stop the generation of preview images, based on thresholds of the memory utilization (third threshold and fourth threshold), without using the thresholds of the utilization of the CPU 101 (first threshold and second threshold).

For example, the process execution requesting unit 271 may determine to start and stop the generation of preview images, by being triggered by the threshold of the utilization of the CPU 101 or the threshold of the memory utilization.

The server device 200 determines whether to generate preview images by comparing a predetermined threshold with the utilization of the CPU 101, etc., and therefore the resources of the server device 200 can be used effectively. Furthermore, preview images are generated when the utilization of the CPU 101 is low, and therefore the time taken for generating preview images becomes short. Accordingly, the response of displaying preview images on the image forming apparatus 300 becomes quick, and the usability in terms of displaying preview images is improved.

Note that the above describes a case where the process execution requesting unit 271 monitors the utilization of the CPU 101, etc.; however, the utilization of the CPU 101, etc., may be monitored by the process executing unit 272.

(2) Operation Procedures

Figure 14:
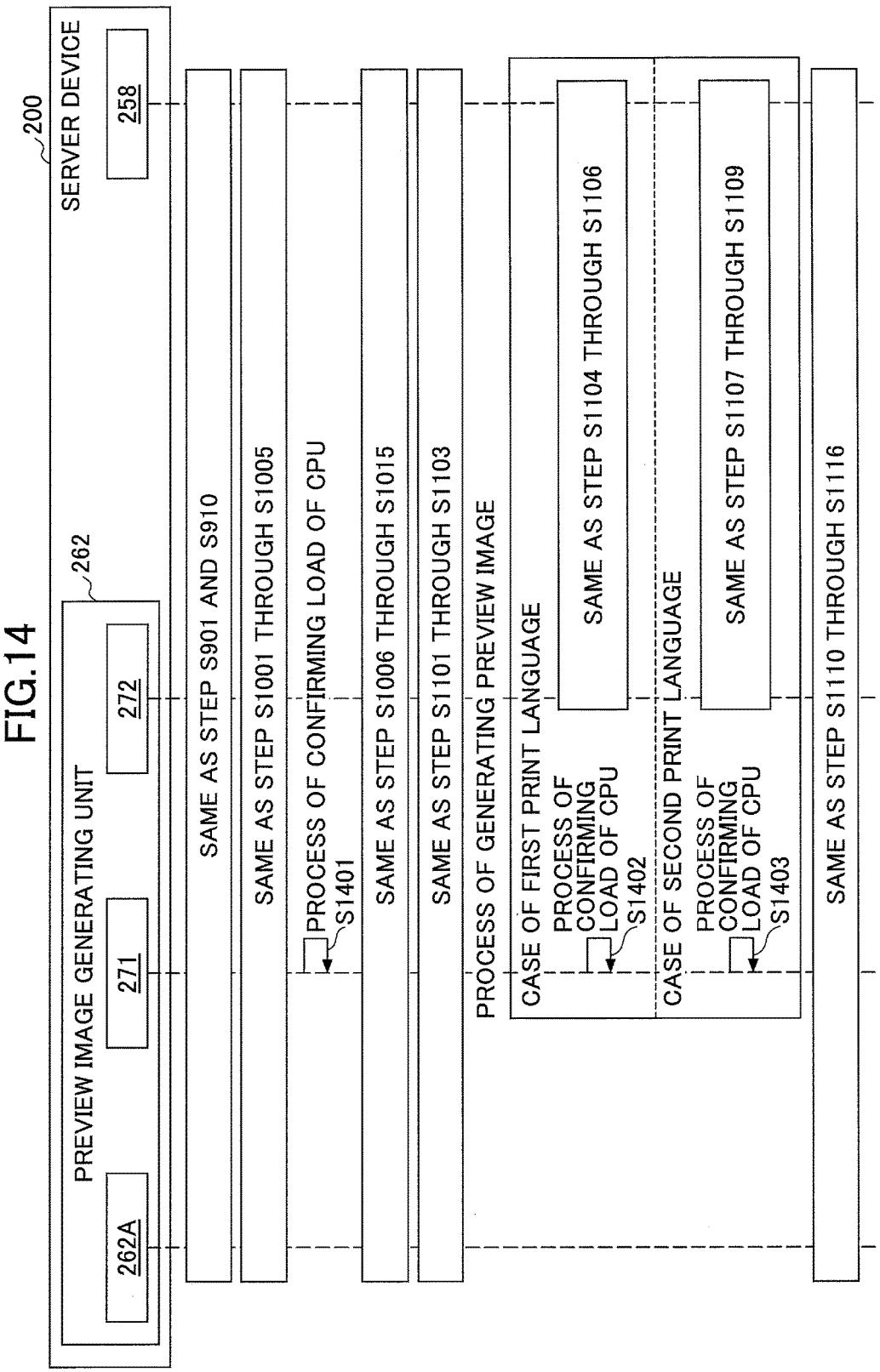
FIG. 14 is a sequence diagram illustrating an example of operation procedures of generating a preview image according to a second embodiment of the present disclosure.

Referring to FIG. 14, a description is given of operation procedures according to the present embodiment.

Figure 15:
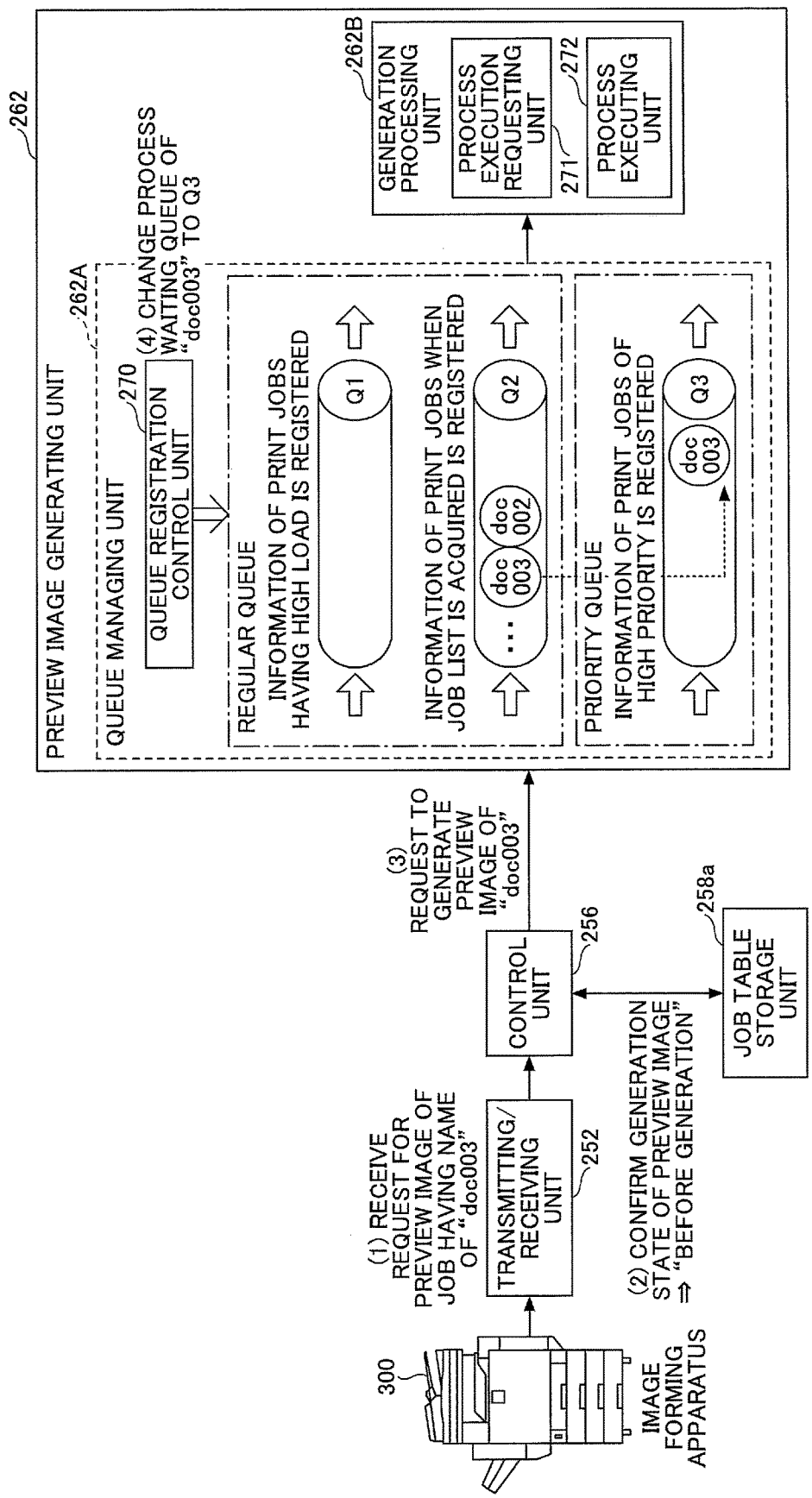
FIG. 15 illustrates an example of a process of generating a preview images according to a modified example of an embodiment of the present disclosure.

FIG. 14 is a sequence diagram illustrating an example of operation procedures according to the second embodiment. FIG. 15 illustrates operations in a process of generating preview images performed by the process execution requesting unit 271 based on the first threshold.

In the second embodiment, the process execution requesting unit 271 executes a process of confirming the load of the CPU 101 when starting the processing method of generating a preview image and when generating a preview image.

The same processes as the processes of steps S901 through S910 and steps S1001 through S1005 are executed.

As a result of step S1005, when the process execution requesting unit 271 determines that the maximum process number of generation in progress will not be exceeded, in step S1401, the process execution requesting unit 271 performs a process of confirming the utilization of the CPU 101. Specifically, the process execution requesting unit 271 confirms whether the utilization of the CPU 101 is less than or equal to the first threshold. When the utilization of the CPU 101 is less than or equal to the first threshold, the subsequent processes are executed. On the other hand, when the utilization of the CPU 101 is higher than the first threshold, after waiting for a predetermined time, the process execution requesting unit 271 confirms whether the utilization of the CPU 101 is less than or equal to the first threshold again.

Subsequently, the same processes as the processes of steps S1006 through S1015 and steps S1101 through S1103 are executed.

When the first print language is applied to the job, a preview image is generated by the same processes as the processes of steps S1104 through S1106. When the process executing unit 272 is executing the process of generating a preview image, in step S1402, the process execution requesting unit 271 performs a process of confirming the load of the CPU 101. Specifically, the process execution requesting unit 271 confirms whether the utilization of the CPU 101 is less than or equal to the second threshold. When the utilization of the CPU 101 is less than or equal to the second threshold, the process executing unit 272 continues to execute the process of generating a preview image. On the other hand, when the utilization of the CPU 101 is higher than the second threshold, the process execution requesting unit 271 instructs the process executing unit 272 to cancel the process of generating a preview image. At this time, the process execution requesting unit 271 may instruct to cancel all of the processes of generating preview images being executed, or may instruct to cancel a process of generating a preview images of a particular job. For example, the process execution requesting unit 271 may measure the processing time, which is the time that has passed since instructing the process executing unit 272 to generate preview images, and the process execution requesting unit 271 may instruct to cancel the process of generating preview images of a job that has been executed for a long processing time.

When the second print language is applied to the job, preview images are generated by the same processes as the processes of steps S1107 through S1109. When the process executing unit 272 is executing a process of generating preview images, in step S1403, the process execution requesting unit 271 performs a process of confirming the load of the CPU 101. The process content is the same as the process content of step S1402.

Note that the process executing unit 272 may receive the instruction to cancel the process and then immediately cancel the process of generating preview images. Alternatively, the process executing unit 272 may complete the process of generating preview images that is being executed, and then cancel the process of generating preview images.

After completing the process of generating preview images, the same procedures as the procedures of steps S1110 through S1116 are executed.

Modified Example

Next, a description is given of a modified example according to an embodiment. In the modified example, a description is given of method of controlling the order of generating preview images by the preview image generating unit 262 of the server device 200.

FIG. 15 is a diagram illustrating an example of a method of generating a preview image by the preview image generating unit 262 according to a modified example of an embodiment of the present disclosure.

In the example of FIG. 15, the queue registration control unit 270 is managing three process waiting queues Q1, Q2, and Q3, at the same time. Note that the number of process waiting queues managed by the queue registration control unit 270 may be set to any value.

In Q1, when a job is received from the client device 100, information of a job having high processing load is registered. A job having high processing load is, for example, a job having a large number of pages for generating preview images, and the process of generating preview images becomes high-load and a requires a long time. Whether the number of pages is large may be determined by setting a predetermined reference value (for example, 100 pages), and determining whether the number of pages is higher than or equal to the reference value.

In Q2, when a job is received from the client device 100, information of a job, other than received jobs having a high processing load, is registered. For example, the information of the jobs is registered in the order of the jobs being input from the client device 100. Furthermore, when a job list is acquired by the image forming apparatus 300, the information of the job included in the acquired list is registered. For example, the information of jobs is registered in the order of jobs in the job list. Here, Q1 and Q2 may be expressed as regular queues.

In Q3, information of a job for which a preview image is to be generated with high priority, is registered. Q3 may be expressed as a queue of high priority. Information of a job for which a user of the image forming apparatus 300 has given an instruction to generate a preview image, is registered.

The generation processing unit 262B confirms whether there is registered information of a job, in the order of Q3, Q2, and Q1. When there is information of a job, the generation processing unit 262B executes processes of generating preview images in an order starting from the first place in the queue. For example, when information of a job is registered in Q3, regardless of whether information of a job is registered in Q2 or Q1, the generation processing unit 262B executes a process of generating a preview image of the job in the first place in Q3. On the other hand, when information of a job is not registered in Q3, the above process is performed in the order of Q2 and Q1.

A description is given of operations when the server device 200 receives a request for a preview image of a job specified by the image forming apparatus 300.

The control unit 256 of the server device 200 receives a request for a preview image of a job from the image forming apparatus 300 via the transmitting/receiving unit 252 ((1) of FIG. 15). The request includes the ID of the job of "doc003". The control unit 256 refers to the job table storage unit 258a and confirms the generation state of the preview image of "doc003", in response to receiving the request.

As a result, when the control unit 256 confirms the generation state of the preview image of "doc003" as "before generation" ((2) of FIG. 15), the control unit 256 requests the preview image generating unit 262 to generate a preview image ((3) of FIG. 15).

The queue managing unit 262A of the preview image generating unit 262 confirms that information of the job of "doc003" is registered in Q2. The queue managing unit 262A determines that the information of the job of "doc003" is to be transferred to the generation processing unit 262B with high priority, and changes the process waiting queue of the information of the job of "doc003" to Q3 ((4) of FIG. 15).

Specifically, the queue managing unit 262A performs a process of registering the information of the job of "doc003" in Q3, and deleting "doc003" registered in the queues of Q1 or Q2.

By the above process, "doc003" is changed to Q3 that is processed with high priority. Therefore, when the number of process of generating preview images executed by the process executing unit 272 is less than the maximum process number that has been set, the process execution requesting unit 271 instructs the process executing unit 272 to generate a preview image of "doc003" that is registered in Q3 with high priority. Accordingly, the timing of starting to generate a preview image of "doc003" is moved up, and the time taken to send the generated preview image to the image forming apparatus 300 can be reduced.

That is, when a job is sent from the client device 100, the user may not yet be in front of the image forming apparatus 300. On the other hand, timing at which a particular job is specified at the image forming apparatus 300 and a request to preview an image is given, is considered to be a timing at which the user operates the image forming apparatus 300 to preview an image. Therefore, it is more convenient for the user if a response is returned more quickly in the latter case than in the former case. Thus, in the former case, the information of a job is registered in a regular queue, and in the latter case, the information of a job is registered in the queue of high priority.

[Other]

In the above embodiments, a description is given of a mode of generating a preview image by the server device 200; however, the preview image may be generated by the image forming apparatus 300. For example, by implementing the same function as the function of the preview image generating unit 262, etc., in the image forming apparatus 300, a preview image can be generated in the image forming apparatus 300.

A storage medium recording the program code of software for realizing the functions of the above embodiments may be supplied to the server device 200. The server device 200 may read and execute the program code stored in the storage medium to achieve the above embodiments. In this case, the program code read from the storage medium realizes the functions of the above embodiments. The storage medium storing the program code forms any one of the embodiments. Here, the storage medium is a recording medium or a non-transitory storage medium.

Furthermore, the functions of the above embodiments are not only realized when a computer device reads and executes a program code. According to instructions of the program code, part of or all of the actual processes may be executed by an operation system (OS), etc., operating in the computer device. Furthermore, the functions of the above embodiments may be realized by the processes executed by the OS.

According to one embodiment of the present disclosure, it is possible to flexibly generate preview images according to various circumstances.

The information processing apparatus, the information processing system, and the control method are not limited to the specific embodiments described in the detailed description, and variations and modifications may be made without departing from the spirit and scope of the present disclosure.

What is claimed is:

1. An information processing apparatus comprising:
   a processor that is configured to:
   receive a print job to be output by an image forming apparatus from a client device via a network, said print job corresponding to a print data item;
   store the print job received by the processor in a first storage device;
   control an operation of printing the print job specified from among one or more of the print jobs stored in the first storage device;
   register a setting for controlling a generation process of generating a preview image corresponding to a print data item of the print job in response to the processor receiving the print job from the client device via the network, the setting being specified by a user via a setting screen;
   generate the preview image of print data item of the print job to be displayed at the image forming apparatus based on the setting, in response to the processor receiving the print job from the client device via the network;
   store the generated preview image in a second storage device;
   accept a display request to display the preview image of the print data item specified from among the one or more of the print data items stored in the first storage device;

confirm whether the requested preview image is already stored in the second storage device, and to generate the preview image when the requested preview image is not stored in the second storage device; and control an operation of displaying the preview image at the image forming apparatus, wherein the processor is further configured to acquire the preview image from the second storage device when the requested preview image is already stored, and acquires the preview image generated by the processor when the requested preview image is not stored.

2. The information processing apparatus according to claim 1, wherein the processor is further configured to:

register the setting that is specified via the setting screen that prompts the user to select whether to execute the generation process of generating the preview image at the timing when the print job is received by the receiver, and generate the preview image of the print data item of the print job received by the receiver, when the registered setting is to execute the generation process of generating the preview image at the timing when the print job is received by the receiver, and the first preview image generator does not generate the preview image of the print data item of the print job received by the receiver, when the registered setting is not to execute the generation process of generating the preview image at the timing when the print job is received by the receiver.

3. The information processing apparatus according to claim 2, wherein the processor is further configured to:

register the setting that is specified via the setting screen that prompts the user to select whether to generate the preview image of all pages of the print data item or to generate the preview image with a limitation when executing the generation process of generating the preview image at the timing when the print job is received by the receiver, and generate the preview image corresponding to all pages of the print job received by the receiver, when the registered setting is to generate the preview image of all pages at the timing when the print job is received by the receiver, and the first preview image generator generates the preview image within the limitation, when the registered setting is to generate the preview image with the limitation at the timing when the print job is received by the receiver.

4. The information processing apparatus according to claim 3, wherein the processor is further configured to:

register the setting that is specified via the setting screen that prompts the user to select an option among a plurality of options expressing a degree of the limitation to be applied when executing the generation process of generating the preview image at the timing when the print job is received by the receiver, and generate the preview image of the print data item by applying the selected degree of the limitation, when the registered setting is to generate the preview image with the limitation at the timing when the print job is received by the receiver.

5. The information processing apparatus according to claim 4, wherein the degree of the limitation is adjusted according to a limited time applied when executing the generation process of generating the preview image, based on a time condition.

6. The information processing apparatus according to claim 4, wherein the degree of the limitation is adjusted according to a limited number of pages applied when executing the generation process of generating the preview image, based on a page condition.

7. The information processing apparatus according to claim 4, wherein the processor is further configured to limit the generation process of generating the preview image based on a page condition when a first print language is used to create the print data item of the print job received by the receiver, and also limit the generation process of generating the preview image based on a time condition when a second print language is used to create the print data item of the print job received by the receiver.

8. A printing system comprising;

a client device;

an information processing apparatus; and an image forming apparatus, wherein the client device includes:

a first processor that is configured to transmit a print job, which is to be printed by the image forming apparatus, to the information processing apparatus, the information processing apparatus includes:

a second processor that is configured to:

receive the print job to be output by the image forming apparatus from the client device, said print job corresponding to a print data item;

store the print job received by the second processor in a first storage device;

transmit the print job to the image forming apparatus that has made a print data acquisition request to acquire the print job specified from among one or more of the print jobs stored in the first storage device;

register a setting for controlling a generation process of generating a preview image corresponding to the print data item of the print job in response to the processor receiving the print job from the client device via the network, the setting being specified by a user via a setting screen;

generate the preview image of the print data item of the print job to be displayed at the image forming apparatus based on the setting, in response to the receiver receiving the print job;

store the generated preview image in a second storage device;

accept, from the image forming apparatus, a preview image acquisition request to acquire the preview image of the print data item specified from among the one or more of the print jobs stored in the first storage device;

confirm whether the requested preview image is already stored in the second storage device, and to generate the preview image when the requested preview image is not stored in the second storage device; and acquire the preview image from the second storage device and transmit the acquired preview image to the image forming apparatus, when the requested preview image is already stored, and to acquire the preview image generated by the second processor generator and transmit the acquired preview image to the image forming apparatus, when the requested preview image is not stored, and the image forming apparatus includes:
a third processor that is configured to
transmit the preview image acquisition request to acquire the preview image to the information processing apparatus;
display, on a screen at the image forming apparatus, the preview image transmitted from the information processing apparatus in response to the preview image acquisition request;
transmit the print data acquisition request to acquire the print job to the information processing apparatus; and
print the print job transmitted from the information processing apparatus in response to the print data acquisition request.

9. The printing system according to claim 8, wherein the second processor is further configured to:
register the setting that is specified via the setting screen that prompts the user to select whether to execute the generation process of generating the preview image at the timing when the print job is received by the receiver, and
generate the preview image of the print data item of the print job received by the receiver, when the registered setting is to execute the generation process of generating the preview image at the timing when the print job is received by the receiver, and the first preview image generator does not generate the preview image of the print data item of the print job received by the receiver, when the registered setting is not to execute the generation process of generating the preview image at the timing when the print job is received by the receiver.

10. The printing system according to claim 9, wherein the second processor is further configured to:
register the setting that is specified via the setting screen that prompts the user to select whether to generate the preview image of all pages of the print data item or to generate the preview image with a limitation when executing the generation process of generating the preview image at the timing when the print job is received by the receiver, and
generate the preview image corresponding to all pages of the print data item of the print job received by the receiver, when the registered setting is to generate the preview image of all pages at the timing when the print job is received by the receiver, and the first preview image generator generates the preview image within the limitation, when the registered setting is to generate the preview image with the limitation at the timing when the print job is received by the receiver.

11. The printing system according to claim 10, wherein the second processor is further configured to:
register the setting that is specified via the setting screen that prompts the user to select an option among a plurality of options expressing a degree of the limitation to be applied when executing the generation process of generating the preview image at the timing when the print job is received by the receiver, and
generate the preview image of the print data item by applying the selected degree of the limitation, when the registered setting is to generate the preview image with the limitation at the timing when the print job is received by the receiver.

12. The printing system according to claim 11, wherein the degree of the limitation is adjusted according to a limited time applied when executing the generation process of generating the preview image, based on a time condition.

13. The printing system according to claim 11, wherein the degree of the limitation is adjusted according to a limited number of pages applied when executing the generation process of generating the preview image, based on a page condition.

14. The printing system according to claim 11, wherein the processor is further configured to limit the generation process of generating the preview image based on a page condition when a first print language is used to create the print job received by the receiver, and further limit the generation process of generating the preview image based on a time condition when a second print language is used to create the print job received by the receiver.

15. A non-transitory computer-readable recording medium storing a program that causes a computer to execute a process, the process comprising:
receiving a print job to be output by an image forming apparatus from a client device via a network, said print job corresponding to a print data item;
storing the received print job in a first storage device;
controlling an operation of printing the print data item specified from among one or more of the print job stored in the first storage device;
registering a setting for controlling a generation process of generating a preview image corresponding to the print data item of the print job in response to the receiving the print job from the client device via the network, the setting being specified by a user via a setting screen;
generating the preview image of the print data item of the print job to be displayed at the image forming apparatus based on the setting, in response to receiving the print data item from the client device via the network;
storing the generated preview image in a second storage device;
accepting a display request to display the preview image of the print data item specified from among the one or more of the print data items stored in the first storage device;
confirming whether the requested preview image is already stored in the second storage device, and generating the preview image when the requested preview image is not stored in the second storage device; and
controlling an operation of displaying the preview image at the image forming apparatus, wherein
the controlling of the operation of displaying the preview image includes acquiring the preview image from the second storage device when the requested preview image is already stored, and acquiring the preview image, which is generated when the requested preview image is not stored, when the requested preview image is not stored.

16. The information processing apparatus according to claim 1, wherein the processor is further configured to:
receive an acquisition request from the image forming apparatus that outputs the print data item, said acquisition request being to request to acquire the preview image of the print data item that is specified from among the one or more of the print data items stored in the first storage device, and
send the acquired preview image to the image forming apparatus according to the acquisition request.

17. The information processing apparatus according to claim 16, wherein the processor is further configured to:
send a list information of the print job that is stored in the first storage device to the image forming apparatus, and receive the acquisition request, from the image forming apparatus, to display the preview image of the print job that is selected by the user at the image forming apparatus according to the list information.

18. The printing system according to claim 8, wherein the second processor is further configured to:
   receive an acquisition request from the image forming apparatus that outputs the print data item, said acquisition request being to request to acquire the preview image of the print data item that is specified from among the one or more of the print data items stored in the first storage device, and
   send the acquired preview image to the image forming apparatus according to the acquisition request.

19. The printing system according to claim 18, wherein the second processor is further configured to:
   send a list information of the print job that is stored in the first storage device to the image forming apparatus, and
   receive the acquisition request, from the image forming apparatus, to display the preview image of the print job that is selected by the user at the image forming apparatus according to the list information.

20. The non-transitory computer-readable recording medium according to claim 15, wherein the process further comprises:
   receiving an acquisition request from the image forming apparatus that outputs the print data item, said acquisition request being to request to acquire the preview image of the print data item that is specified from among the one or more of the print data items stored in the first storage device, and
   sending the acquired preview image to the image forming apparatus according to the acquisition request.

21. The information processing apparatus according to claim 1, wherein the processor is further configured to generate a job list containing the print job associated with a user of the client device and send the job list to the image forming apparatus.

* * * * *